(12) United States Patent
Kleo et al.

(10) Patent No.: US 11,312,292 B2
(45) Date of Patent: Apr. 26, 2022

(54) LUMINOUS MOTOR-VEHICLE GLAZING UNIT

(71) Applicant: SAINT-GOBAIN GLASS FRANCE, Courbevoie (FR)

(72) Inventors: Christophe Kleo, Attichy (FR); Keihann Yavari, Margny les Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/287,038

(22) PCT Filed: Oct. 30, 2019

(86) PCT No.: PCT/EP2019/079647
§ 371 (c)(1),
(2) Date: Apr. 20, 2021

(87) PCT Pub. No.: WO2020/089288
PCT Pub. Date: May 7, 2020

(65) Prior Publication Data
US 2021/0380034 A1      Dec. 9, 2021

(30) Foreign Application Priority Data

Oct. 31, 2018  (FR) ...................................... 1860101

(51) Int. Cl.
*B60Q 1/26* (2006.01)
*F21S 43/14* (2018.01)
(Continued)

(52) U.S. Cl.
CPC ............ *B60Q 1/2665* (2013.01); *F21S 43/14* (2018.01); *F21S 43/19* (2018.01); *F21S 43/239* (2018.01); *F21S 43/245* (2018.01)

(58) Field of Classification Search
CPC ........ B60Q 1/2665; F21S 43/14; F21S 43/19; F21S 43/239; F21S 43/245
See application file for complete search history.

(56) References Cited

U.S. PATENT DOCUMENTS

2014/0003076 A1    1/2014  Suganumata et al.
2014/0240998 A1*   8/2014  Richard ............... G02B 6/0095
                                                            362/510
(Continued)

FOREIGN PATENT DOCUMENTS

EP          1 234 752 A1    8/2002
WO       WO 01/90787 A1    11/2001
(Continued)

OTHER PUBLICATIONS

International Search Report as issued in International Patent Application No. PCT/EP2019/079647, dated Jan. 17, 2020.

*Primary Examiner* — Bryon T Gyllstrom
*Assistant Examiner* — Christopher E Dunay
(74) *Attorney, Agent, or Firm* — Pillsbury Winthrop Shaw Pittman LLP

(57) ABSTRACT

A light glazing for a motor vehicle includes a first transparent sheet, a masking zone with a first unmasked zone, a first light source, coupled optically to a transparent element, called light guide, a first extraction device for extracting light guided in the light guide, the first light extraction device being opposite the first unmasked zone so that one or more of the illuminated patterns are visible on the side of the second main face, on the second main face side, an opaque rear masking element, covering the first light extraction device, the first light extraction device being between the second main face and the rear masking element.

20 Claims, 9 Drawing Sheets

(51) Int. Cl.
*F21S 43/19* (2018.01)
*F21S 43/239* (2018.01)
*F21S 43/245* (2018.01)

(56) References Cited

U.S. PATENT DOCUMENTS

| | | | |
|---|---|---|---|
| 2015/0210226 A1* | 7/2015 | Topart | B60R 13/02 362/509 |
| 2015/0375673 A1 | 12/2015 | Testai et al. | |
| 2016/0236613 A1* | 8/2016 | Trier | B60Q 1/482 |
| 2018/0170013 A1* | 6/2018 | Hubert | B32B 17/10532 |
| 2019/0078751 A1* | 3/2019 | Colombel | F21S 43/50 |
| 2019/0255813 A1* | 8/2019 | Bauerle | F21S 45/50 |
| 2019/0272779 A1* | 9/2019 | Gamble | B60Q 1/2626 |
| 2020/0103093 A1* | 4/2020 | Negel | B60R 13/02 |
| 2020/0172001 A1* | 6/2020 | Muegge | F21S 41/43 |
| 2020/0276792 A1* | 9/2020 | Laluet | B32B 17/10761 |
| 2020/0298534 A1* | 9/2020 | Berard | B32B 17/10119 |
| 2020/0319391 A1* | 10/2020 | Vasylyev | G02B 6/005 |
| 2021/0061167 A1* | 3/2021 | Messenger | G09F 13/04 |
| 2021/0078488 A1* | 3/2021 | Scherer | B60Q 3/208 |
| 2021/0107401 A1* | 4/2021 | Ferrieres-Zhao | B32B 17/10018 |
| 2021/0170724 A1* | 6/2021 | Hennion | B32B 17/10293 |

FOREIGN PATENT DOCUMENTS

| | | |
|---|---|---|
| WO | WO 2012/140362 A1 | 10/2012 |
| WO | WO 2013/068679 A1 | 5/2013 |
| WO | WO 2016/156720 A1 | 10/2016 |

* cited by examiner

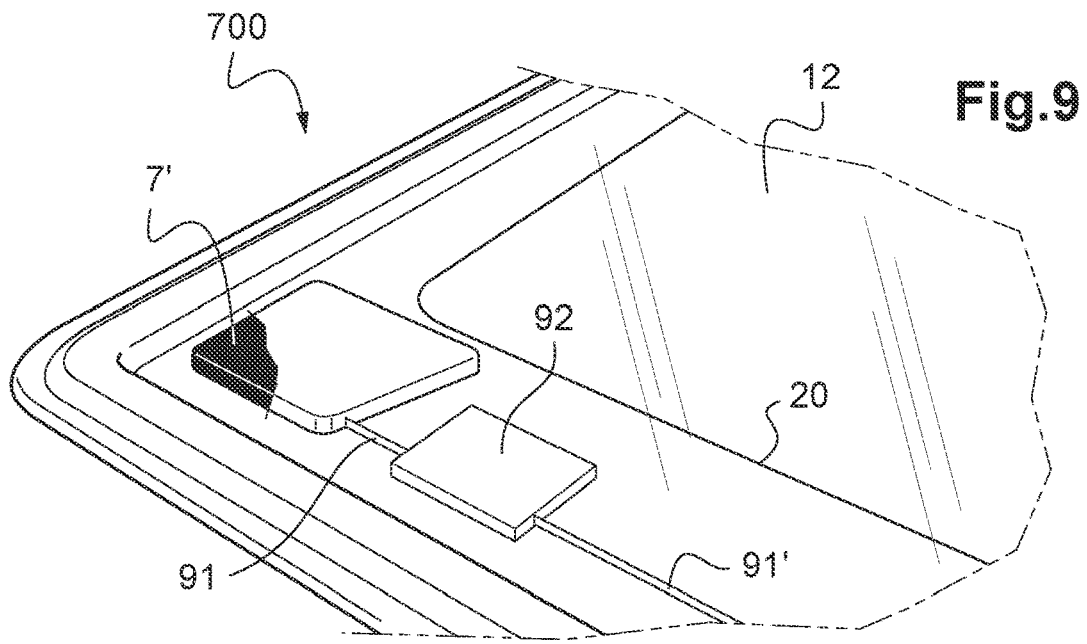
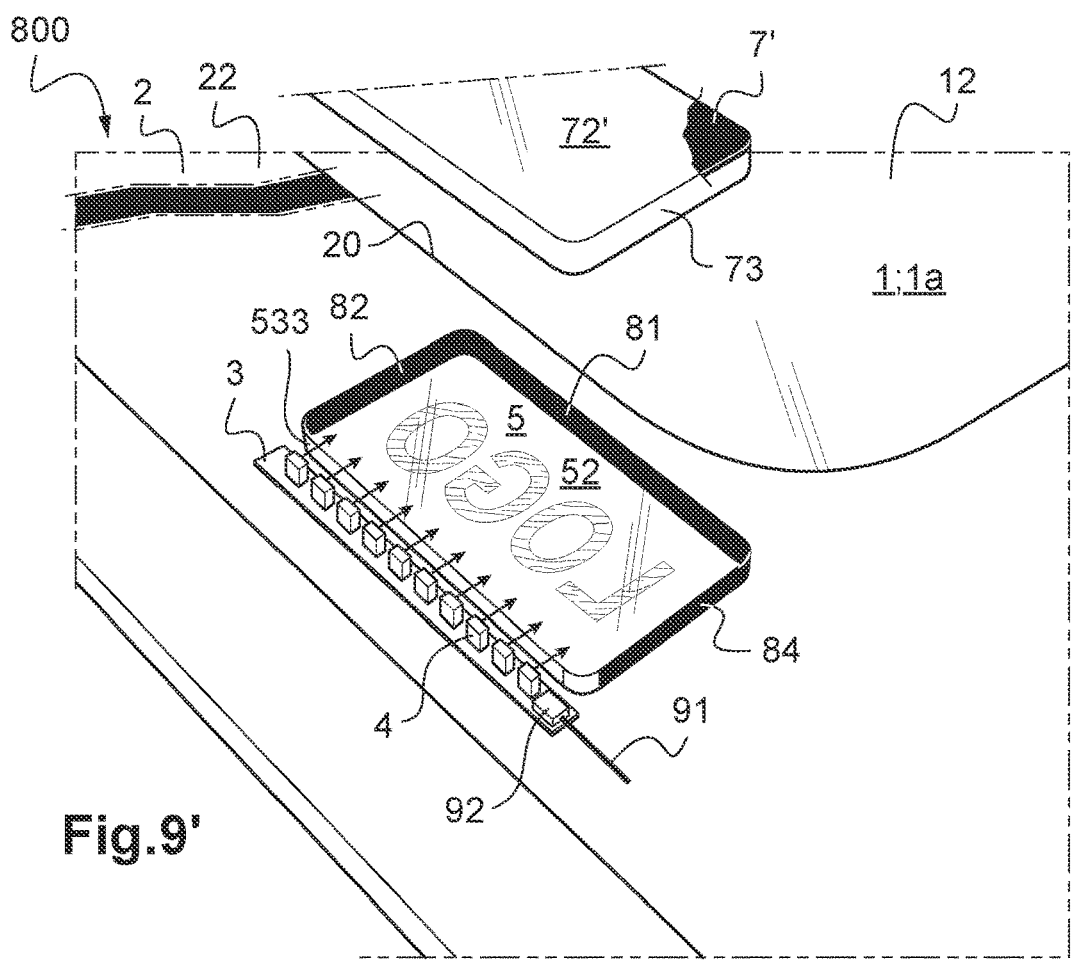

LUMINOUS MOTOR-VEHICLE GLAZING UNIT

CROSS-REFERENCE TO RELATED APPLICATIONS

This application is the U.S. National Stage of PCT/EP2019/079647, filed Oct. 30, 2019, which in turn claims priority to French patent application number 1860101 filed Oct. 31, 2018. The content of these applications are incorporated herein by reference in their entireties.

The present invention relates to light glazing for a motor vehicle.

In the motor vehicle field, it is known practice to twin certain signaling lights such as the rear lights, direction indicator lights, stop lights or reversing lights, with light sources synchronized with these signaling lights and of the same color as the latter. These light sources can be placed inside the vehicle interior, generally in proximity to the rear window, as described for example in the application EP1234752. In the glazing described in that document, light-emitting diodes (LED) are opposite an inner main face of the window visible through an aperture left in the frame enamel. They are placed in a housing situated at the boundary of the inner face.

However, these additional signaling lights are not totally satisfactory in terms of visual comfort and from an esthetic point of view.

The present application proposes motor vehicle glazing with light patterns visible from the outside (for external signage, external light signaling or for external light decoration) that is more satisfactory from an esthetic point of view, and without being detrimental to the industrial requirements.

Consequently, the subject of the present application is light glazing for a motor vehicle (car, truck, bus, commercial vehicle, etc.) that is notably fixed (preferably) or partially opening (pivotable), comprising:
- a first transparent sheet, preferably tinted, notably dished, preferably made of plastic or of glass, notably tempered, with a first main face F1 intended to be directed toward the outside of the vehicle, a second main face F2 intended to be directed toward the interior of the vehicle, and an edge (polygonal, rectangular, triangular or other such sheet),
- opposite one of the faces F1 or F2, preferably on one of the faces, and, better, on the face F2, a masking zone, made of an opaque material, a masking zone (preferably strip) of width W of at least 0.8 cm and, better, 1 cm, and, notably, of at most 9 cm overall if forming a strip, and notably even of length L of at least 10 cm, the masking zone covering substantially the first sheet (possibly apart from the marginal zones) or preferably comprising a strip, notably linear, extending (along an axis X) along a rim of the glazing, even being bent (in L shape) or even forming a frame, preferably a strip at the periphery of the face F2, even F1,
- a first unmasked zone in the masking zone (preferably strip), preferably closed, therefore surrounded by the masking zone (preferably strip),
- a first light source, preferably comprising a first set of light-emitting diodes (LED) each having a light-emitting face, diodes on a first source support, preferably opaque or reflective the light emitted by the first light source being visible on the side of the face F2 exiting through the first unmasked zone.

The light glazing according to the invention also comprises, on the side of the face F2, notably (if monolithic glazing) on the face F2 and even fixed (glued, etc.) onto the face F2, a (first) transparent element, with an outer main face Fe oriented on the face F2 side and an inner main face Fi opposite (to Fi) and a rim, the first light source being coupled optically to said transparent element, called light guide, preferably to a rim, called coupling rim of the light guide, or to the wall, called coupling wall of a cavity, passing through or blind in the thickness of the light guide.

The light emitted by the first light source is guided in said transparent element, called light guide, the outer main face Fe of the light guide (notably on the face F2, in particular if the glazing is monolithic) is opposite the first unmasked zone and also behind the masking zone (strip), possibly the light guide not extending beyond the rim of the first sheet (of the rim of the glazing) on the side of the masking zone.

The light glazing according to the invention further comprises:
- first light extraction means, capable of extracting the light guided in said light guide, preferably on the outer main face Fe or in the thickness of the light guide, even on the inner main face Fi, the first light extraction means being opposite the first unmasked zone, so that one or more of the illuminated patterns are visible on the side of the face F2,
- on the face F2 side, preferably on the transparent element (and of similar size), an opaque rear masking element, covering the first light extraction means and the first light extraction means being between the face F2 and the rear masking element.

When the first light source emits in the ultraviolet (UV), the light device comprises a layer based on fluorescent luminophore capable of converting the extracted ultraviolet light into visible light, in particular the first light extraction means comprise a fluorescent luminophore and/or the first unmasked zone comprises a layer based on fluorescent luminophore.

When the first sheet has a see-throught portion (the masking zone being non-covering, preferably peripheral and/or a strip), the first light source, a possible first source support, and the rear masking element are absent from the see-throught portion and even preferably control means of the first light source and electrical power supply wiring of the first light source as well as, preferably, the light guide, are absent from the see-throught portion.

Finally, the first extraction means are in the form of one or more first spaced-apart patterns Mi (notably signage, decor, signaling), when the first light source is in operation the illuminated pattern or patterns Mi being visible on the side of the face F1, and/or the first unmasked zone is formed by one or more spaced-apart patterns Me (notably signage, decor, signaling), so that, when the first light source is in operation the illuminated pattern or patterns Me are visible on the side of the face F1.

The first unmasked zone forms the desired pattern or patterns Me (notably signage, decor, signaling) or frame the light pattern or patterns Mi obtained (directly) by the first light extraction means (the first unmasked zone leaves these patterns Mi visible). It is possible to have the patterns Mi and Me coinciding.

It is possible to choose, custom-fashion, the desired pattern or patterns and their functions from the moment that they are visible from the outside when illuminated.

The rear masking element render the illuminable patterns more discrete and less perceptible in the off state.

The first unmasked zone can be a simple discontinuity of the masking zone or be (wholly or partly) covered by a layer based on luminophore and/or even a filtering layer (for example white light source and selective filter allowing red, green, yellow, etc to pass). It is also, alternatively or cumulatively, possible to use a selective filter between the first light extraction means and the face F2 (on the face F2 for example).

It is possible to adjust the tint and/or the absorption of the first sheet, for example:
the first sheet having a light transmission TL of at least 5% and, better, at least 20% and, even at least 50% or 70%, and/or to have a blue, gray or green tint.

Since the perceived light is diffuse, it is less dazzling than direct-emitting diodes. The luminance can be from 20 to 100 $Cd/m^2$.

Moreover, the possible see-throught portion is preserved, which participates in a more esthetic glazing.

The light device formed by the first light source, the light guide and covered by the rear masking element and a possible cover is easy to mount and reliable. It is possible to provide a polarizer on the first sheet to face up to the first mask or use a gluing template to glue the light device onto the first sheet if the glazing is single or a second transparent sheet if the glazing is laminated.

The light guide can extend along the edge of the first sheet (for example also along a peripheral masking strip) entirely facing the face F2 and possibly extend beyond the faces of the first sheet by one side of the first sheet. For example, it extends along a first border (bottom or top) of the first transparent sheet and possibly extends beyond one or more of the side borders (left and/or right).

The light guide can also extend at the periphery of the face F2 and extend beyond the faces of the first sheet by one side or several sides of the first sheet. For example, it is partly adjacent to a first border (bottom, etc.) of the first transparent sheet and extends beyond this first border.

The face Fe is preferably on the face F2 (or F4 if the glazing is laminated), placed or, better, fixed (glued). The face Fe is opposite the first unmasked zone, at the very least the first extraction means (all or part).

Preferably, to satisfy the motor vehicle standards currently in force (car, truck, etc.), the opaque masking zone is of black or gray color C1 and the opaque rear masking element, notably a background covering, is of color C2 identical or similar to C1, notably of black or gray color.

The colorimetric deviation is thus reduced to the maximum possible to tend toward invisibility of the patterns in the off state.

C1 can be of another color and C'1 of said identical or similar other color, preferably meeting the standards that are likely to change for motor vehicle glazings (car, truck, etc.).

Regarding the placement, the first light source and even a possible first support of the first light source, called first source support (and even a possible second light source) is notably:
a) wholly or partly behind the masking zone (preferably strip), and in particular the light guide and the first light source (even a possible second light source) and even its possible first source support are wholly behind the masking zone
b) wholly or partly offset from the main faces F1 and F2, and after the mounting between the edge of the vehicle (and therefore masked from the inside) and the bodywork (and therefore masked from the outside).

For the case a) or b), the first light source can preferably be:
secured to a first rim of the light guide which is a coupling rim, fixed directly or preferably via a first source support or a securing profile section (L or U-shaped, etc) onto the light guide, the light guide notably extending beyond the edge of the first sheet (on the side of the opaque masking zone)
or housed (with its possible first source support) in a first through or blind cavity of the light guide.

When the glazing forms a fixed window (intended to be) adjacent to a sliding window, preferably placing the first light source (with its possible first source support) in the region (intended to be) between the fixed window and the sliding window, a region which generally comprises one or more profile sections (most often U-shaped) guiding the sliding window, is avoided.

More broadly, even placing any other element of the invention (light guide, wiring, control means, etc.) in this region is avoided.

Advantageously regarding the placement (in a generally reduced space):
the first light source (and even each light source coupled optically to the light guide)—preferably inorganic light-emitting diodes—is masked from the outside, that is to say invisible on the side of the face F1:
masked by the masking zone (notably diodes with emitting faces normal to F2, on the first source support) by possibly extending beyond the edge of the first sheet
and/or wholly or partly offset from the face F2 (remote from the first sheet), notably able to be housed between a vehicle edge and bodywork of the vehicle in mounted position
and preferably a first support of the first light source, called first source support, is masked from the outside, that is to say invisible on the side of the face F1 (and even each light source support),
masked by the masking zone (notably spaced apart from or on the face F2) notably extending beyond the edge of the first sheet
and/or wholly or partly offset from the face F2 (remote from the first sheet), possibly with the first light source, notably able to be housed between a vehicle edge and bodywork of the vehicle in mounted position,
and even:
control means of the first light source (and even each light source coupled optically to the light guide) being masked from the outside, that is to say invisible on the side of the face F1 (preferably on the first source support):
masked by the masking zone (notably spaced apart from or on the face F2, possibly on the first source support) notably extending beyond the edge of the first sheet
and/or wholly or partly offset from the face F2 (remote from the first sheet) alone or the first source support, notably able to be housed between a vehicle edge and bodywork of the vehicle in mounted position F2.

In particular, the first light source can be mounted on a first support, called first source support, extending beyond the edge of the first transparent sheet in a zone called peripheral zone devoid of encapsulation, notably polymeric (overmolding) first source support, notably able to be housed between a vehicle edge and bodywork of the vehicle in mounted position, and/or the light guide extends into a zone called peripheral zone devoid of encapsulation, notably polymeric (overmolding), notably able to be housed between a vehicle edge and bodywork of the vehicle in mounted position.

Preferably, the light glazing comprises a masking cover (opaque), notably plastic and/or metallic, masking the first light source and a possible first support of the first light source, called first source support, possible control means of the first light source, the light guide, the cover covering or forming the rear masking element, possibly fixing the guide onto the face F2, the cover being masked from the outside by the masking zone (strip, etc.) and possibly partly extending beyond the edge of the first sheet, notably able to be housed between a vehicle edge and bodywork of the vehicle in mounted position.

Moreover, the first light source can be configured so as to be able to receive control signals governing the switching on/switching off thereof.

The light glazing can comprise control means of the first light source, notably on a first support of the first light source (front face with diodes notably and/or rear face), notably a microcontroller, in particular the first light source (and even each light source coupled optically to the guide) being switched on according to setpoint(s).

For example, the setpoint can be linked to information given by at least one sensor to the control means. The sensor can be in the vehicle, on the glazing or in proximity to the light glazing, or elsewhere.

In the case of the rear window, it can be information given by a radar (reversing, etc.).

For example, the setpoint can be linked to activation information delivered by a remote control signal (wireless, notably WiFi), for example from a remote control. This activation can be triggered upon an opening of a door (if the glazing is a side glazing) or of the trunk (if the glazing is a rear window).

Said control means are preferably absent from the possible see-throught portion, remote from the first sheet and/or masked by the masking zone (strip, etc.).

Obviously, whatever the function of the light pattern or patterns of the present invention, the first light source comprises an electrical power supply system, standalone or attached to the electrical system of the vehicle. The on state can be provided only when the vehicle is in operation (stopped or rolling).

Preferably, the first light source is supplied electrically, notably via electric wiring.

The electric wiring, the electrical power supply are preferably absent from the possible see-throught portion.

The wiring can be:
wholly or partly masked from the outside by the masking zone (strip)
and/or wholly or partly offset from the face F2 (remote from the first sheet).

In case of encapsulation of the first sheet (of the glass), the encapsulation material can cover the wiring and have it exit at a point for example in a zone (notably of connection of the wiring in the vehicle) such as an edge or corner adjacent or opposite to the edge of the first sheet closest to the first unmasked zone.

The wiring can be flat cable, notably of a thickness of at most 1 cm or 0.5 mm and/or of a width of at most 3 cm or 1 cm.

Advantageously, the first light extraction means are inscribed in a surface SL (with an outline or perimeter PL), the rear masking element is a masking background (preferably solid or with discontinuities giving a rate of coverage of at least 90%, 95%), and is inscribed in a surface SF with a perimeter PF, and SF covers SL and is greater than or equal to SL.

Preferably, to tend toward the invisibility of the patterns in the off state, the rear masking element forms a masking background and (is on the internal face Fi side):
covers substantially the inner face Fi of the light guide (for example apart from the marginal zones) when the light guide is circumscribed in the masking zone
or, when the light guide extends beyond the edge of the first sheet (for example on the side of an opaque strip with the first unmasked zone), the rear masking element (inner face side) covers at least the region of the inner face Fi facing the face F2.

The rear masking element, if in plate form and covering, can also assist in mechanically protecting the light guide during mounting and subsequently (avoiding scratches, etc.).

The rear masking element can be on the inner face Fi, preferably forming a masking background 13 preferably placed on the inner face Fi or glued onto all or part of the perimeter of the face Fi—for example absent on the side of the optical coupling in the case of opaque glue, is chosen from among:
a plate (film etc.) that is opaque (in mass), for example of at most 3 mm or 1 mm or 0.5 mm
an opaque coating (ink, paint, etc.), for example of submillimetric thickness, and even of at most 50 μm, notably on a sheet (plastic, etc.) of at most 0.5 mm
the plate of an opaque cover also having one or more opaque walls or flanges opposite the rim of the light guide and covering the rim, preferably coming into contact with the face F2 or spaced apart by at most 1 mm or glued to the face F2, the cover can be the element which positions the assembly on the glazing.

The cover and/or the rear masking element and the light guide can be secured (and then added to and better fixed onto the face F2): the cover and/or the rear masking element can be fixed onto the light guide by any means, notably: by force fitting, by clips on the periphery, by gluing, possibly snap riveting.

An adhesive strip can cover all or part of the free face of the rear masking element or of the cover and extend over the face F2 to fix the rear masking element or even the set rear masking element and light guide assembly onto the face F2.

The light guide and even the rear masking element (and the first light source and the first source support) can be placed in the cover for any means, notably by force-fitting.

The masking zone can be a strip, possibly forming a masking frame:
with an outer border oriented toward the edge of the first sheet, notably spaced apart by at most 3 mm from the edge,
and with an inner border delimiting a see-throught portion of the first sheet,
the masking zone is notably an opaque element (opaque film, etc.) added onto the first sheet (made adhesive, etc.) or preferably a deposition (for example by printing or screen printing) like an ink or an enamel (black or gray preferably) on the face F2.

Preferably, the first unmasked zone extends longitudinally, notably in a strip of the masking zone.

The first unmasked zone can emerge on the see-throught portion and/or on the other side or be closed therefore surrounded by the masking zone (strip).

In the case of laminated glazing, a second transparent sheet is more internal to the first sheet and with third and fourth main faces F3 and F4. This second transparent sheet can comprise an inner masking layer (black or gray preferably like the masking zone) on the face F3 or F4 with another unmasked zone that is larger or that coincides with the first unmasked zone preferably on the face F2.

In one embodiment, the first light extraction means are in the form of one or more spaced-apart patterns Mi which are inscribed in a surface SL with an outline or perimeter PL, the first unmasked zone is an aperture which has a perimeter PE which coincides substantially with PL.

In a preferred embodiment for the invisibility of the patterns in the off state, the first unmasked zone is formed by one or more spaced-apart patterns Me and preferably the first light extraction means are in the form of said first spaced-apart pattern or patterns Mi and of form substantially identical to Me and coinciding with the pattern or patterns Me or homothetically enlarged, notably with an offset of 0 to 25% of the pattern Me and/or of at most 20 mm or even of at most 5 mm.

And even better, the rear masking element is a masking background covering the light guide (or at least the region of the light guide facing the face F2 in the case of a light guide extending beyond).

Each pattern Me of the first unmasked zone and/or Mi of the first light extraction means can be at least 0.5 mm or 1 cm.

A pattern Me of the first unmasked zone can be superposed on an extraction pattern Mi or even there is a solid extraction zone in which the pattern Me is inscribed.

For example a letter of the pattern Me corresponds to the same letter of the pattern Mi or to an extraction zone in which the letter of pattern Me is inscribed.

For example, a word of several letters of the pattern Me corresponds to one same word of several letters of the pattern Mi or to an extraction zone in which all the word of the pattern Me is inscribed.

The masking zone is preferably a layer, a deposition obtained by liquid pathway, on the face F2, in particular the opaque layer is an enamel or an ink (black or gray preferably).

The layer can be solid and optionally with a set—even a shading—of spot patterns (discs, etc.) toward the possible see-throught portion.

The person skilled in the art is familiar with the application of opaque enamels, generally of black color, at the borders of motor vehicle glazing.

In the case of a layer of ink, this ink not generally needing to be subjected to temperatures as high as enamel, the use of an ink allows additional application possibilities. Indeed, the ink can be applied by printing, for example by screen printing, flexography or ink jet printing on one of the main faces of the first sheet. However, in the case of laminated glazing, it can also be applied on one of the faces of the lamination separator, which is located, after assembly, in direct contact with one of the inner main faces of the first sheet and of a transparent second sheet.

The black inks for glass printing are familiar to the person skilled in the art. The printing of the lamination separator with black inks is described for example in the document WO2012/140362.

Although it can in principle be envisaged, in some cases of vehicle windows, for example for the vent light or the rear quarterlight (side glazing fixed onto the bodywork, respectively at the front and at the rear of the vehicle), that all the surface of the glazing is covered with an opaque layer (ink or complete enameling or even added opaque film), it is generally essentially, notably for the rear window and some side windows, for the glazing to comprise at least one transparent zone, called "see-throught portion", not covered by the opaque layer.

This see-throught portion represents generally at least 20%, preferably at least 50% and in particular at least 70% of the total surface of the first sheet, including the zones covered by the encapsulation. In other words, the opaque zone covers a zone which generally represents at most 80%, preferably at most 50% and in particular at most 30% of the total surface of the first sheet.

The optical density of the opaque masking layer (enamel, ink, etc.) is preferably at least equal to 2 and, better, from 2.5 to 5.

The optical density of the opaque masking layer (enamel, ink, etc.) forming the rear masking element is preferably at least equal to 2 and, better, from 2.5 to 5.

This can be (in mounted position on the vehicle):
top (often longitudinal) rim,
bottom (often longitudinal) rim,
left (often side) rim,
right (often side) rim,
on several rims, on a corner (L-shaped, etc.).
The strip can form an L or even a masking frame.

When several signages or light decorations are desired that can be illuminated together or independently, all the abovementioned means can all or partly be duplicated.

At the very least, the masking zone (notably a strip) can comprise two or more unmasked zones (as many unmasked zones as necessary), notably distant or close together, for example adjacent, and on one and the same strip (bottom, top, etc.).

It is then possible to duplicate the light guide (and the rear masking element) or to use two (or more) light extraction zones of the first light guide—without the possibly different colors being mixed.

It is possible to have a common rear masking element for several light guides, even a common cover.

The masking zone can comprise a strip of width W of at most 80 mm with the first unmasked zone.

The light guide according to the invention is notably:
made of glass or plastic, preferably colorless, light or extra light,
and/or flat or curved, flexible (adapted, according to the curvature of the first sheet),
of width W' less than or equal to the width W of the masking zone (strip, etc.) and/or of at least 1 or 3 or 5 cm
and preferably of a thickness of at most 8 or 5 mm,
flexible, plastic, behind the masking strip and extending beyond the rim of the glazing.

The light guide is produced for example from a transparent plastic material. This transparent plastic material is for example a polymethyl methacrylate (PMMA) or polycarbonate (PC) or a polyester, in particular a poly(ethylene terephthalate) or PET.

The light guide for example is of simple form with a given surface encompassing the first unmasked zone: rectangular, square, triangular or even be a round, etc., in other words the form most suited to the pattern and to the available footprint.

The thickness of the light guide is sufficient for the optical coupling, the injection of light from the first light source (via the emitting faces of the diodes).

For simplicity, it is preferred not to insert any optical element between the first light source (the diodes) and the light guide.

For example, the diodes are side-emitting which makes it possible to minimize the thickness of the light guide.

In this case, the first source support is against, even glued to, the face F2 (or F4 if the glazing is laminated), because that can make it possible to reduce the footprint of the assembly.

The first source support can also be on a part placed or fixed onto the face F2 (or F4) at the boundary of the rim of the guide or in a cavity of the guide.

In the case of a single glazing, the outer face Fe of the light guide can be spaced apart (by at most 10 mm or 5 mm) or, better, placed on the face F2 or glued to the face F2 by an adhesive—optical or opaque glue (silicone etc.), double-sided adhesive tape—preferably peripheral between the faces F2 and Fe, on one or more sides.

In the case of a laminated glazing, the outer face Fe of the light guide can be spaced apart (by at most 10 mm or 5 mm) or, better, placed or glued onto a second transparent sheet (with faces F3 and F4 most oriented toward the vehicle interior), laminated with a polymeric lamination separator to the first transparent sheet, the outer face Fe glued by an adhesive, notably transparent—optical or opaque glue (silicone etc.), double-sided adhesive tape—preferably peripheral between the faces F4 and Fe, on one or more sides.

In the case of single or laminated glazing, preferably:
the adhesive (glue, double-sided adhesive tape) is offset from the first light extraction means
and/or forms a strip of width of at most 10 mm (overall in the case of opaque adhesive)
or forming a frame, continuous or discontinuous strip (spots of glue, etc.).

In the case of single or laminated glazing, avoiding full-face gluing is preferred. It is possible to glue using a double-sided adhesive or a thermo-reticulatable glue. The bead of glue requires a deposition means and a finishing, that can be avoided with a double-sided adhesive.

It may even be preferable for the gluing to be absent along the optical coupling rim or an optical coupling wall if the first light source is in a cavity, passing through or blind in the light guide. For example, the gluing is done on two or three other borders.

Adhesive materials for fixing the rear masking element to the light guide and/or the light guide to the face F2 or of a second transparent sheet in the case of laminated glazing that can be cited include:
a UV-reticulatable glue,
a double-sided adhesive tape, a tape (acrylic, PU, etc.) made adhesive with acrylic glue,
a transparent glue (internal or external): polyurethane, silicone, acrylic.

A first light source may be wanted which extends over all or part of the edge of the glazing.

More specifically, the first source support may extend over all or part of the edge of the first sheet, for example encircling the edge.

The first source support can have a thickness of at most 1 cm or 0.5 cm, 0.5 mm. The first source support can be flexible or rigid.

A first light source (preferably diodes) may be wanted which extends over several rims:
over two adjacent rims (of a rectangle, square, etc.) in order to ensure uniformity on two opposing rims (of a rectangle, square, etc.) to be uniform in rendition
over all the rim of the light guide, on all the sides (of a rectangle, square, etc.) if the aim is, for example, to associate different colors or to make an animation of the pattern, or for more light by taking account of a reduced footprint.

The first light source is preferably a first set of inorganic light-emitting diodes on a front face of a first source support (opaque or reflective) and possibly the glazing comprises a second light source which is a set of inorganic light-emitting diodes on a second source support (opaque or reflective) or on the rear face of said first support.

The diodes are top-emitting or side-emitting.

Preferably, for the side-emitting diodes, the emitting faces are of a height of at most 1.5 mm.

Preferably, for the top-emitting diodes, the emitting faces are of a height of at most 2 mm and even the first diode support is a bar of length less than or equal to the thickness of the light guide.

The side-emitting diodes have the advantage of offering a more reduced footprint than the top-emitting diodes. By contrast, the top-emitting diodes are more powerful and less costly than the side-emitting diodes.

The first source support (diodes) is typically a printed circuit board called PCB which is a bar (flexible or rigid). It can be covered with a tropicalizing lacquer, an opaque or reflecting paint, etc.

Notably if the light guide is made of plastic, the distance between the first light source (preferably diodes) and the first extraction means can be at most 10 cm to limit the absorption.

The masking zone can comprise a strip with an inner border delimiting a see-throught portion. The first sheet can have a see-throught portion, delimited by the inner border of the masking strip. The light guide preferably comprises:
a first output rim facing the optical coupling rim or an optical coupling wall and on the side of the (along the) inner border of the masking strip
and the light glazing comprises means for trapping, reflective or preferably opaque (absorption), the guided light likely to exit through the first output rim.

That makes it possible to avoid a light halo in the see-throught portion.

The optical density of the opaque layer (enamel, ink, etc.) of the means for trapping and absorbing (opaque), guided light is preferably at least equal to 2 and, better, from 2.5 to 5.

The light glazing advantageously comprises trapping means, reflecting or preferably absorbing (opaque) guided light likely to exit through the rim of the guide, notably chosen from among:
an opaque layer (black, white, etc.) on the rim of the light guide (a first rim or more of the guide) or on an element against or spaced apart by at most 1 cm or 5 mm from the rim of the light guide
an opaque adhesive tape (black, white, etc.) on the rim of the light guide (a first rim or more of the guide)
opaque (side) walls or flanges of a cover including the main plate covering the rear masking element or forming said rear masking element, walls on or spaced apart by at least 1 cm from the rim of the light guide (a first rim or more of the guide)
a first support of the first light source (notably top-emitting diodes), called first source support, notably encircling the light guide, or a second source support on which is mounted a second light source (notably top-emitting diodes)—rim opposite and/or adjacent to that (of coupling) of the first source support.

That also reinforces the invisibility of the patterns in the off state because it greatly reduces, even eliminates, the diffusion of stray light.

The optical density of the opaque layer (enamel, ink, etc.) of the means for trapping and absorbing (opaque) guided light is preferably at least equal to 2 and, better, from 2.5 to 5. Furthermore, the first light source can be coupled optically to a first rim of the guide, called coupling rim, or to a wall of a cavity of the guide, called optical coupling wall, and the glazing preferably also comprises an opaque or reflective element opposite the optical coupling rim or the optical coupling wall and spaced apart by at most 1 cm, or 5 mm, which is a first support of the first light source, called first source support (notably top-emitting diodes), or an opaque wall or flange of a cover covering the rear masking element or forming said rear masking element.

In one embodiment, the light guide, notably plastic, has a cavity, blind or right through in the thickness of the light guide, notably linear and even bent (in the form of an L) or even circular or oblong, housing the first light source (preferably diodes), a first wall of the walls delimiting the cavity being coupled optically to the first light source.

When the wall is curved, the first source support can be flexible to adapt to the curvature of the wall. The first source support can be on a part placed or fixed onto the face F2 (or F4) in the cavity.

In this latter embodiment with a cavity, the guide can have a cavity (preferably linear like a groove), blind or right through the thickness, for guiding the electric wiring supplying the first light source (preferably diodes), notably in continuity with the cavity to house the first light source.

In the latter embodiment with a cavity, the cavity can house a second light source, notably back-to-back with the first light source, and a wall, delimiting the cavity, being coupled optically to the second light source and the light guide having second light extraction means separated from the first light extraction means by the cavity (rectilinear like a groove or even bent in the form of an L, circular or oblong etc.).

For example, the first and second light sources are diodes on two opposite sides (main faces) of a first source support or the first light source are diodes on a front face of a first source support and the second light source are diodes on a front face of a second source support spaced apart from (by at most 5 mm) or against the rear face of the first source support.

The total thickness of the assembly comprising the light guide, rear masking element and a possible cover covering the rear masking element can be at most 10 mm, notably from 2 to 8 mm and even 3 to 5 mm. Notably when the first light source is a set of side-emitting inorganic light-emitting diodes with emitting faces of at most 1.5 mm, the thickness of the light guide is at most 2 mm and even at most 1.5 mm.

The glazing can be a laminated glazing comprising:
said first sheet of glass (tinted, etc.)/a polymeric lamination separator, notably thermoplastic (PVB, EVA, etc.)/a second sheet of glass (identical or similar size) whose free face is intended to be the internal face of the vehicle (commonly called face F4)
said first sheet of plastic (tinted, etc.)/thermoplastic lamination separator (PVB, EVA, etc.)/second sheet of glass (identical or similar size) whose free face is intended to be the internal face of the vehicle (commonly called face F4)
said first sheet of glass (tinted, etc.)/thermoplastic lamination separator/second sheet of plastic (polyester, PET, PC, PMMA, etc.) (identical or similar size) whose free face is intended to be the internal face of the vehicle (commonly called face F4)

In the case of a laminated glazing, the light guide is preferably on or even fixed (glued, etc.) onto the face F4.

If the laminated glazing comprises another masking zone (inner) on face F3 or F4 opposite the masking zone (on face F2 preferably), another unmasked zone is produced congruent with the first unmasked zone and/or with the pattern or patterns Mi.

However, preferably, the glazing is single—the first transparent sheet of glass or plastic is not laminated to a second transparent sheet of similar size—the face F2 is the face intended to be the internal face of the vehicle.

For the first sheet, preference will be given to using a sodiocalcic mineral glass, preferably tempered:
tinted like the TSA 3+, 4+or 5+ green glass marketed by the Applicant or even the Venus GREY 40, 30, or even 20 and 10 gray glass marketed by the Applicant
colorless such as the Planilux® or Planiclear glass marketed by the Applicant.

In the case of a single glazing, the first sheet of glass, preferably tempered, or of plastic (PMMA or PC) typically has a thickness lying between 2 and 6 mm, in particular 3.15 mm, 3.85 mm, 4.85 mm.

The first sheet can be of any form: round, polygonal (rectangular) etc.

It can be:
a side window, notably single, in particular
  a fixed side window: fixed front door (front door quarterlight), fixed rear door (rear door quarterlight), rear quarterlight (six light), a vent light (windscreen quarterlight)
  a pivoting opening side window
or even:
a rear window (backlight), notably made of dished and tempered glass and the glazing is single,
a roof or dome comprising a border extending at the top boundary of the windshield, notably the first sheet is made of tempered glass or of plastic (PC etc.) and the glazing is single or the glazing is laminated,
a front vent light
a windshield (notably laminated).

To extract the light, there are many extraction means familiar to the person skilled in the art and commonly used in the field of glazing. The first light extraction means can be, for example:
a textured zone (frosted, by acid application, abrasion, etc.)
a diffusing coating
an etched zone in the thickness
or even diffusing elements, such as particles incorporated in the mass (for a plastic light guide preferably).

Any diffusing coating commonly used in the field of glazing can be used as diffusing coating. Such a coating generally comprises particles having a size of the order of a micrometer and a binder, organic or mineral, making it possible to make these particles adhere to the surface of the glass. The particles can be made of metal or of metallic oxide.

Their average size is typically between 50 nm and 1 micrometer. A diffusing coating described for example in the international application WO 01/90787.

The extraction means can be white or colored.

The first light extraction means are preferably on the outer face Fe or in the thickness of the light guide.

Alternatively, the first extraction means on the face Fi, is for example a diffusing enamel then an opaque enamel (black, etc.) congruent above forming the rear masking element.

In a preferred embodiment, the first sheet is a fixed side window with a see-throught portion preferably and a first peripheral unmasked zone on the face F2, in particular a rear quarterlight, fixed front door window, fixed rear door window, a vent light.

In particular, the first unmasked zone is on a bottom masking strip and the patterns form a LOGO, a decorative element that can be read horizontally.

In particular the first unmasked zone is on a bottom masking strip and the patterns form a LOGO, a decorative element that can be read vertically.

The color of the light visible from the outside can be determined, among other things:
- by the spectrum of emission of the first or (or each) light source,
- by the spectrum of absorption of the guide
- by the spectrum of absorption/of emission of the material forming the light extraction means
- by any added tinted element, for example: a tinted lamination separator in adhesive contact with the first face F2 of the first sheet, or by a filter
- by the spectrum of absorption of the first sheet.

Examples of preferred embodiments that can be cited are as follows:
- LED of auto yellow color and a white extraction material in possible combination with a first non-tinted sheet;
- LED of auto yellow color and an orange or yellow extraction material in possible combination with a first non-tinted sheet;
- LED of white color and an orange or yellow extraction material in possible combination with a first non-tinted sheet.

In a first production configuration, the first sheet of glass comprises a peripheral polymeric (opaque) encapsulation which is an overmolding over all or part of the perimeter of the edge.

The encapsulation can be of polyurethane, notably of PU-RIM (RIM for reaction in-mold), the cross-linking of the two-component PU taking place in the mold, once the two components are injected simultaneously. This material is typically injected up to 130° C. and a few tens of bars. Other encapsulation materials are:
- preferably flexible thermoplastics: thermoplastic elastomer (TPE), polyvinyl chloride (PVC), ethylene-propylene-diene terpolymer (EPDM), typically injected between 160° C. and 240° C. and up to 100 bar,
- rigid thermoplastics: polycarbonate (PC), polymethyl methacrylate (PMMA), polyethylene (PE), polypropylene (PP), polyamide (PA66), acrylonitrile butadiene styrene (ABS), ABSPC, typically injected between 280° C. and 340° C. and between 500 and 600 bar.

In one case, the light guide and the first source support entirely face the face F2. The encapsulation can be over all the perimeter of the first sheet of glass.

The encapsulation can be single-face (on face F2 or F4), two-face (on face F2 or F4 and on the edge) or three-face (on face F2 or F4 on the edge and on the face F1).

In the case where the light guide and/or the first source support are offset from the face F2 by extending beyond over a first rim of the first sheet, the encapsulation can preferably be absent from the zone of the first rim, as already described.

A part (plastic and/or metal, such as aluminum, steel) like an insert, a rigid part, a trim, pins, can be anchored on the encapsulation and/or mounted on top.

In a second production configuration, the first sheet of glass comprises an element such as a peripheral (opaque) polymeric extrudate over all or part of the perimeter of the glazing.

The function of the signaling will then depend on its position in the vehicle and on the color of the light emitted by the light extraction means.

The pattern or patterns Me and/or Mi can form:
- a decoration element,
- signage
  - informative: (pictogram, monogram, symbol, etc.): opening of door, tailgate, fuel filler cap, alarm cutoff, battery charge indicator, safe distance, failure indicator, traffic indicator, road indicator, taxi busy or empty
  - and/or advertising (manufacturer's LOGO, name of the vehicle, vehicle type: emergency, etc.)
- road signaling (turn signal light, side light, stop light repeater).

In the present application, the signage denomination is founded on an icon-driven and/or language-driven semantic, that is to say using signs (numerals, pictograms, logos, symbolic colors etc.) and/or a letter or word.

When it is intended to operate as a direction indicator light, the light glazing according to the invention emits an auto yellow color light (see Counsel Directive No. 76/759/CEE dated 27 Jun. 1976, Annex V). It is then situated at the rear windscreen when it is a rear flashing indicator (category 2), on a side window when it is a turn signal light repeater (category 5), or on the windshield when it is a front turn signal light (category 1).

Similarly, the light glazing will emit a red light when it operates as a rear light or stop light, and a white light when it for example concerns a reversing light. In both of these cases, the light glazing obviously corresponds to the rear windscreen.

In an embodiment of the vehicle of the present invention, the light glazing is a direction indicator light, capable of emitting a flashing auto yellow light. It is preferably a turn signal light repeater (category 5 direction indicator light; Counsel Directive No. 76/759/CEE dated 27 Jun. 1976), situated level with the vent lights or front fixed side windows.

The invention is suitable for a windshield defined by its lateral and longitudinal borders and with an opaque peripheral framing, such as an enamel, on face F2 and on face F3 or on face F2 and F4.

Another subject of the present invention is a vehicle, preferably a motor vehicle, comprising at least one light glazing as described above.

The present invention will now be described with reference to the attached figures in which FIG. 1 represents a front schematic view of a light glazing on the side of the outer face F1 and in the on state in a first embodiment of the invention.

FIG. 1' represents a front schematic view of the light glazing on the side of the outer face F1 in the off state of the first embodiment.

Figure 8:
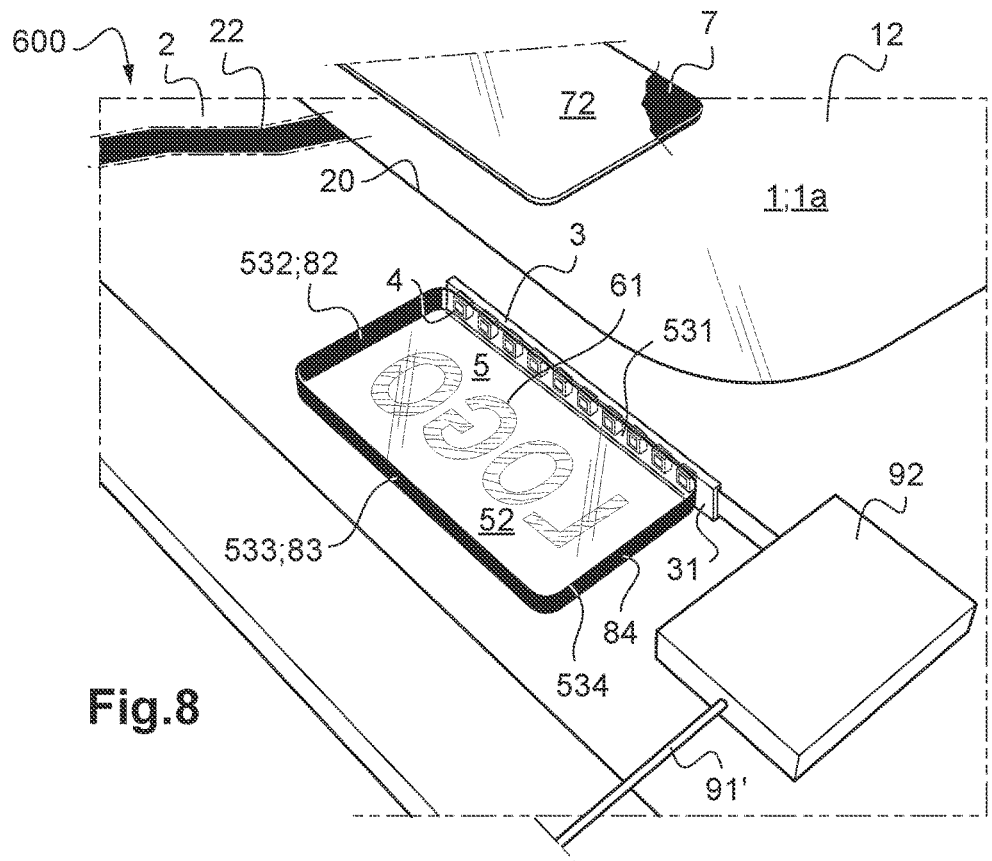
FIG. 8 represents a partial perspective schematic view of a light glazing in a sixth embodiment according to the invention.
Figure 8:
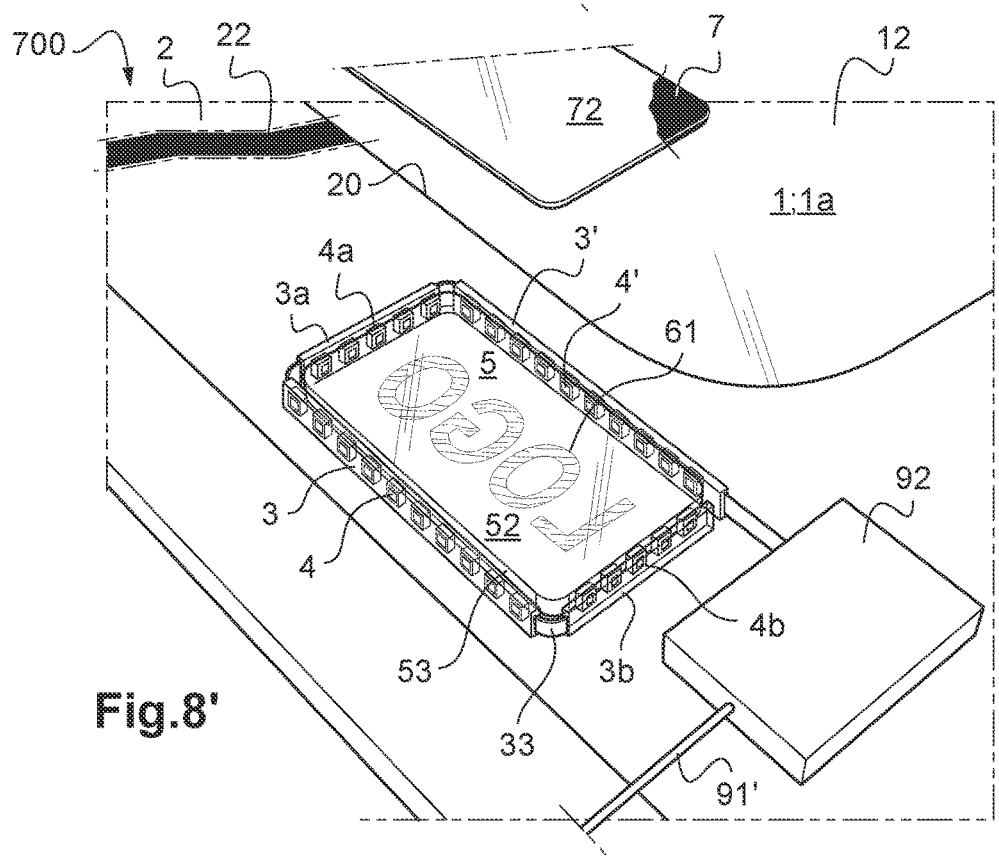

FIG. 8' represents a partial perspective schematic view of a light glazing in a seventh embodiment according to the invention.

FIG. 9 represents a partial perspective schematic view of the light glazing of the seventh embodiment.

FIG. 9' represents a partial perspective schematic view of the light glazing in an eighth embodiment according to the invention.

Figure 10:
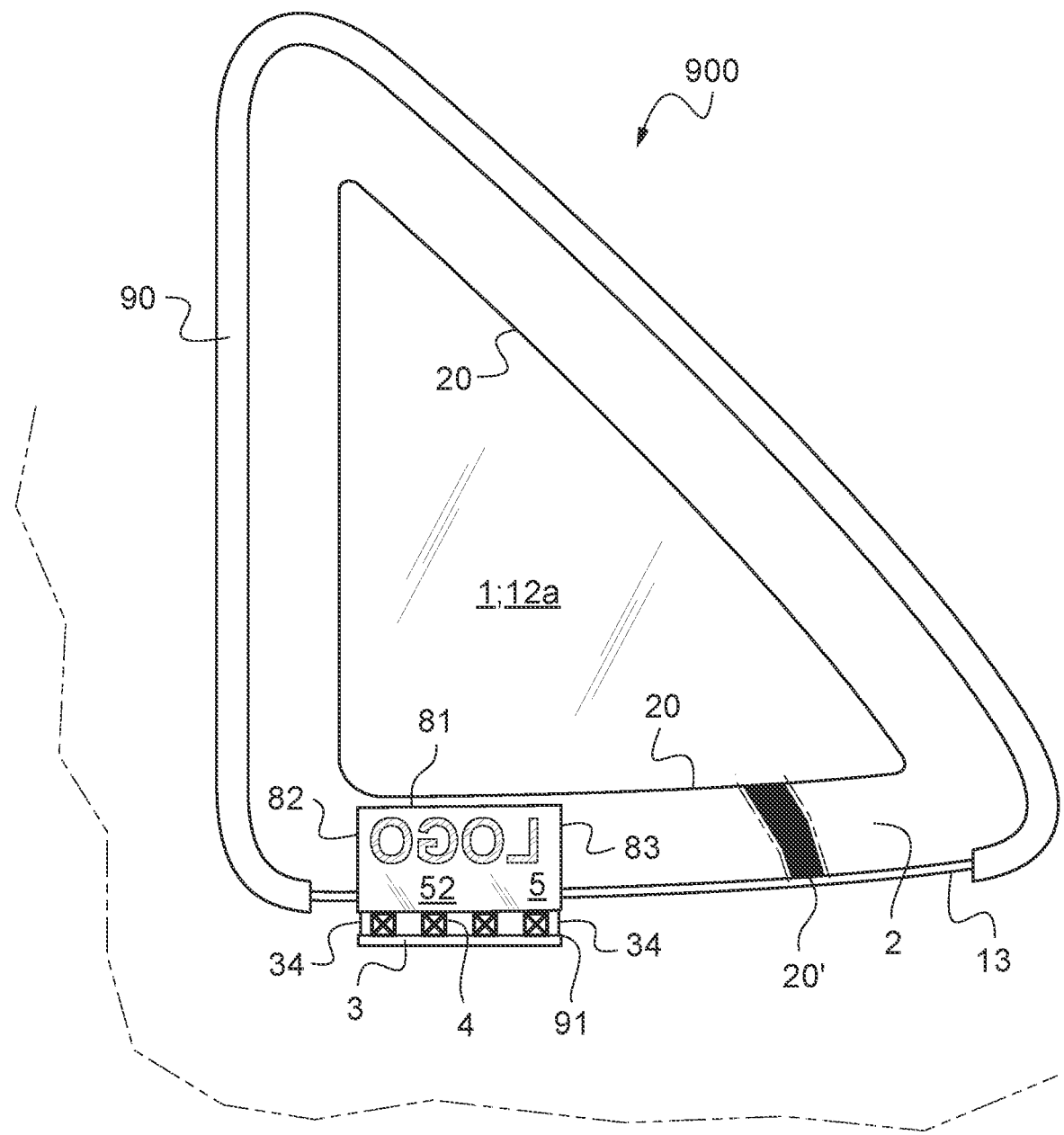

FIG. 10 represents a partial front schematic view of the light glazing in a ninth embodiment according to the invention.

Figure 11:
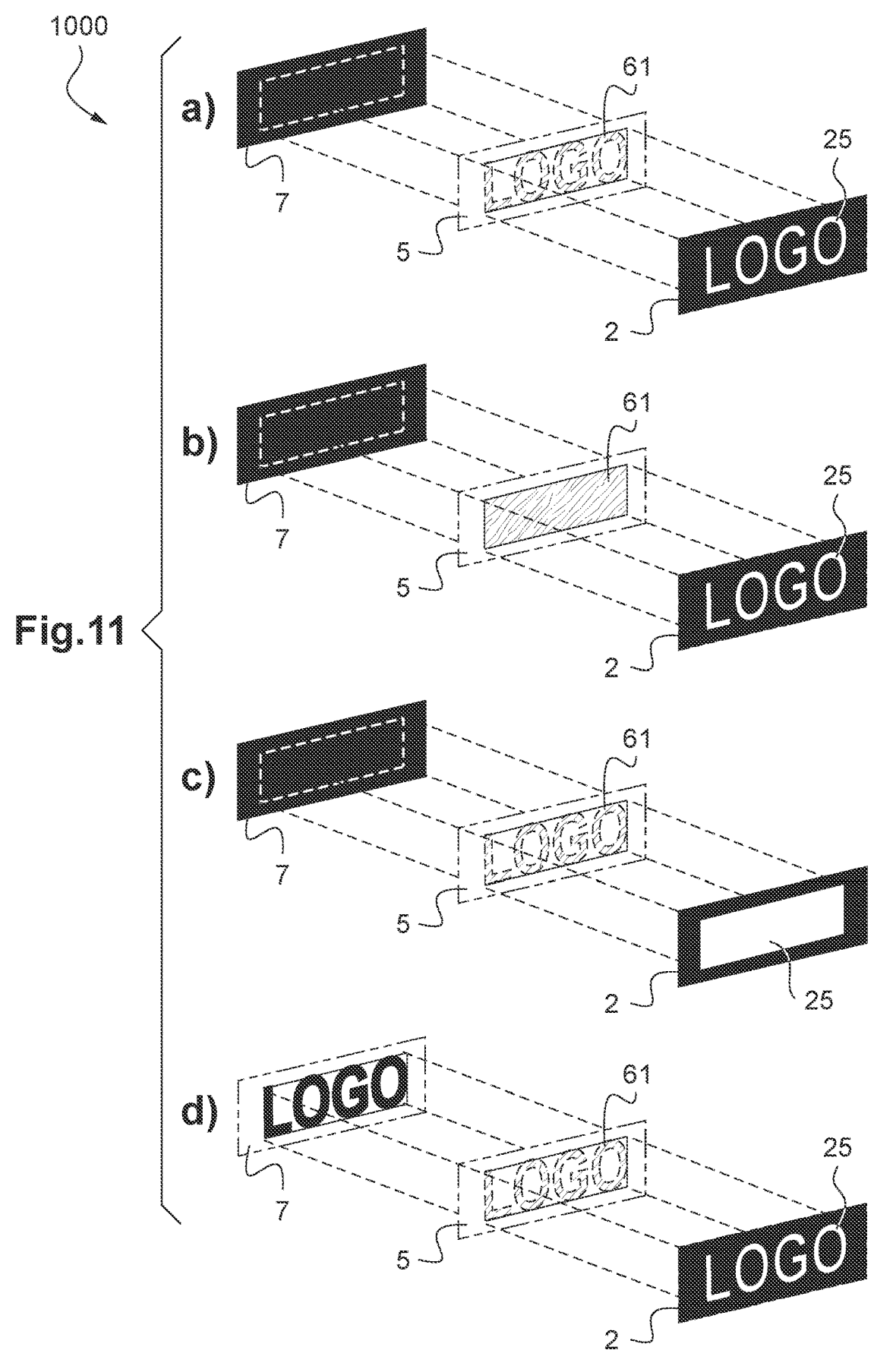

FIG. 11 represents a schematic view showing, respectively on the left and on the right, four configurations of superpositioning of the rear masking element, of the light guide with the first light extraction means and of the masking zone with the first unmasked zone, in a tenth embodiment according to the invention.

Figure 12:
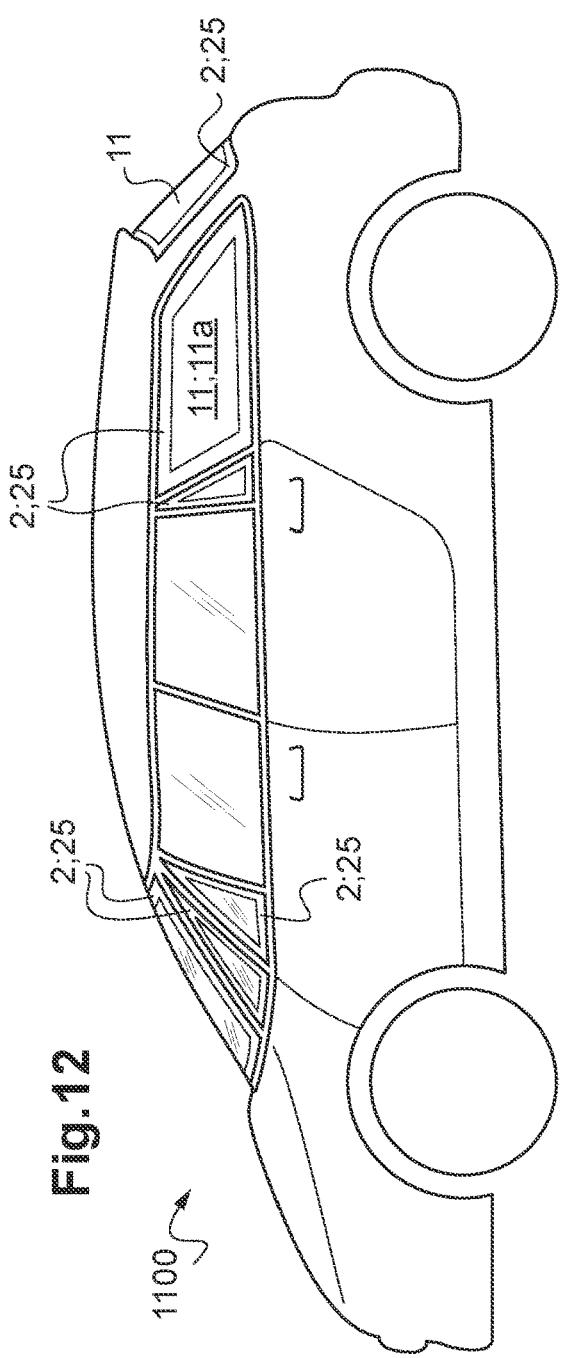

FIG. 12 represents a side schematic view of a vehicle incorporating light glazings in an eleventh embodiment according to the invention.

Figure 13:
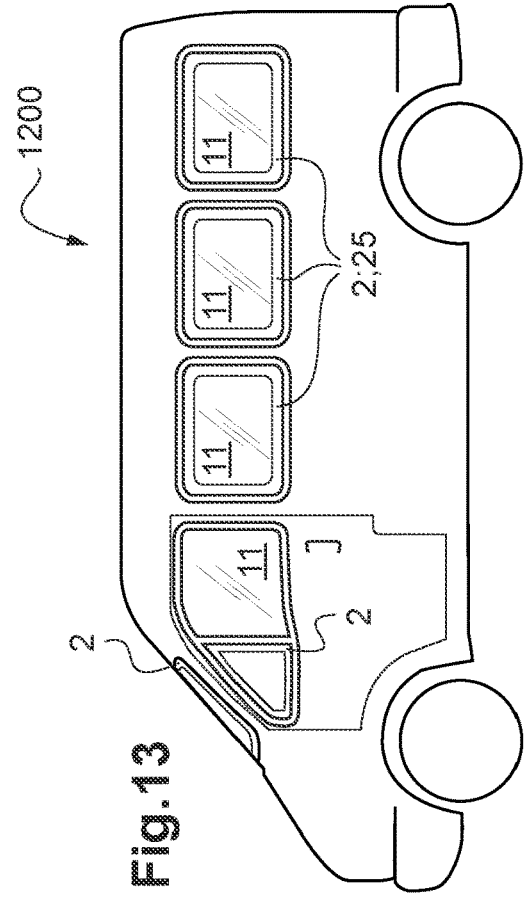

FIG. 13 represents a side schematic view of a vehicle incorporating light glazings in a twelfth embodiment according to the invention.

Figure 14:
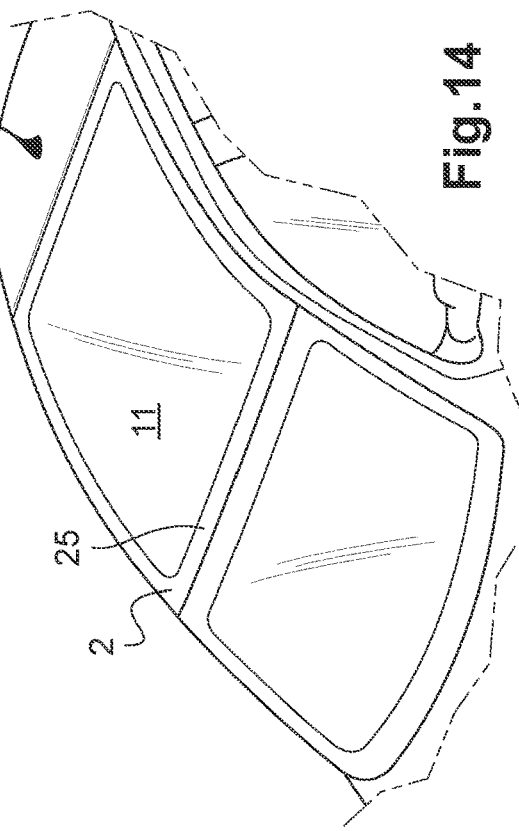

FIG. 14 represents a partial perspective schematic view from the front of a vehicle incorporating a light glazing in a thirteenth embodiment according to the invention.

Figure 1:
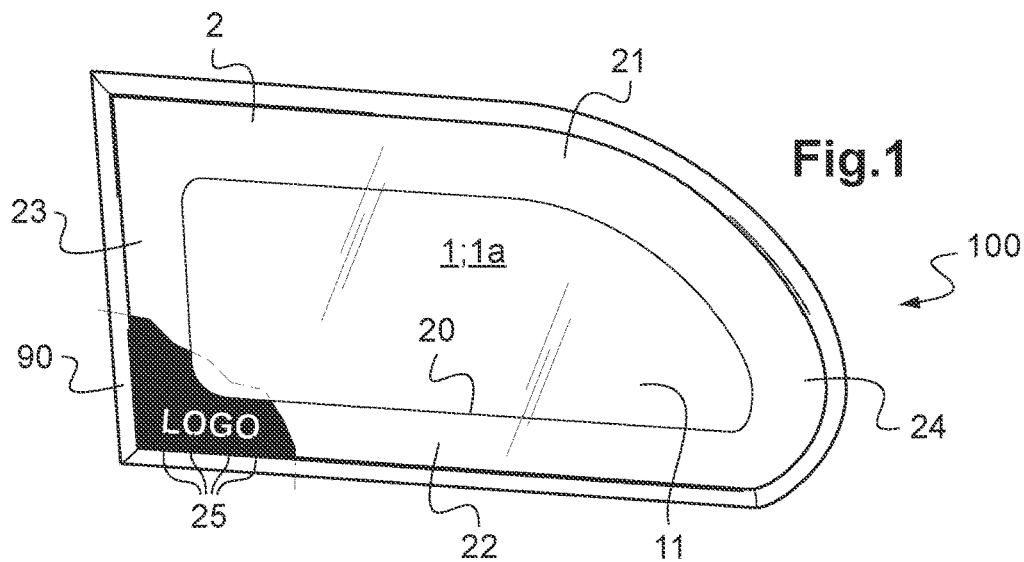
Figure 1:
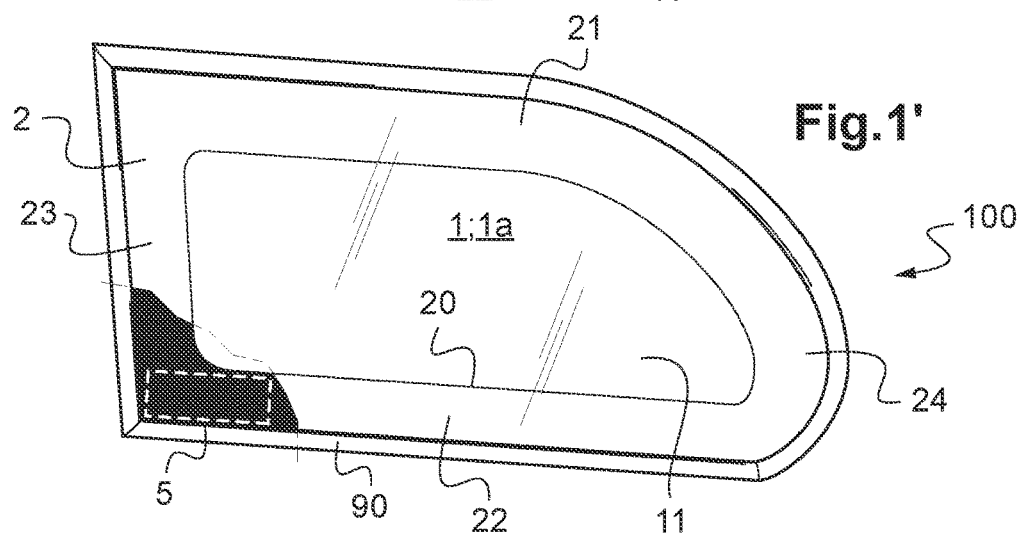

FIG. 1 represents a front schematic view of a light glazing 100 in the on state in a first embodiment of the invention. FIG. 1' represents a front schematic view of the light glazing on the side of the outer face F1 in the off state of the first embodiment. This is a single light glazing of a motor vehicle 100 (car, truck, bus), here fixed (preferably), such as a rear quarterlight or a vent light comprising:

- a first transparent sheet 1, preferably of glass, notably tempered and/or tinted, or of plastic, notably tinted, of 3.15 mm thickness such as the TSA3+ green glazing sold by the Applicant with a main face 11 called F1 intended to be directed toward the outside of the vehicle, a main face F2 intended to be directed toward the interior of the vehicle, and an edge,
- on the face F2, a masking frame 2 of black or gray ink or enamel (visible by transparency in FIG. 1) with bottom and top strips 21, 22 on the left and right 23, 24 leaving a see-throught portion 1a delimited by an inner border 20 of the strip, for example of width W of 3 cm
- a first unmasked zone 25 in the corner of the bottom longitudinal masking strip 21, unmasked zone closed therefore encircled by the strip 22, here representing the letters LOGO, for example letters 2 cm high by 1 cm wide
- behind the bottom masking strip 22:
  - a light device comprising:
    - a first light source, which is a first set of light-emitting diodes (LED) each having a light-emitting face, diodes on a front face of a first opaque source support,
    - on the face F2, a light guide 5 (rectangular, see dotted lines in FIG. 1') which is transparent with, on a main face of the light guide, a diffusing pattern in the form of the same letters LOGO of the same size as or larger than the LOGO of the unmasked zone 25 and facing the first unmasked zone
  - a masking background for the diffusing LOGO behind the light guide, black or gray such as enamel 2,
  - a framing polymeric encapsulation 90.

When the diodes are off, the first unmasked zone seems quasi-invisible by virtue of the masking background.

The light device is masked from the interior by the vehicle trim.

Figure 2:
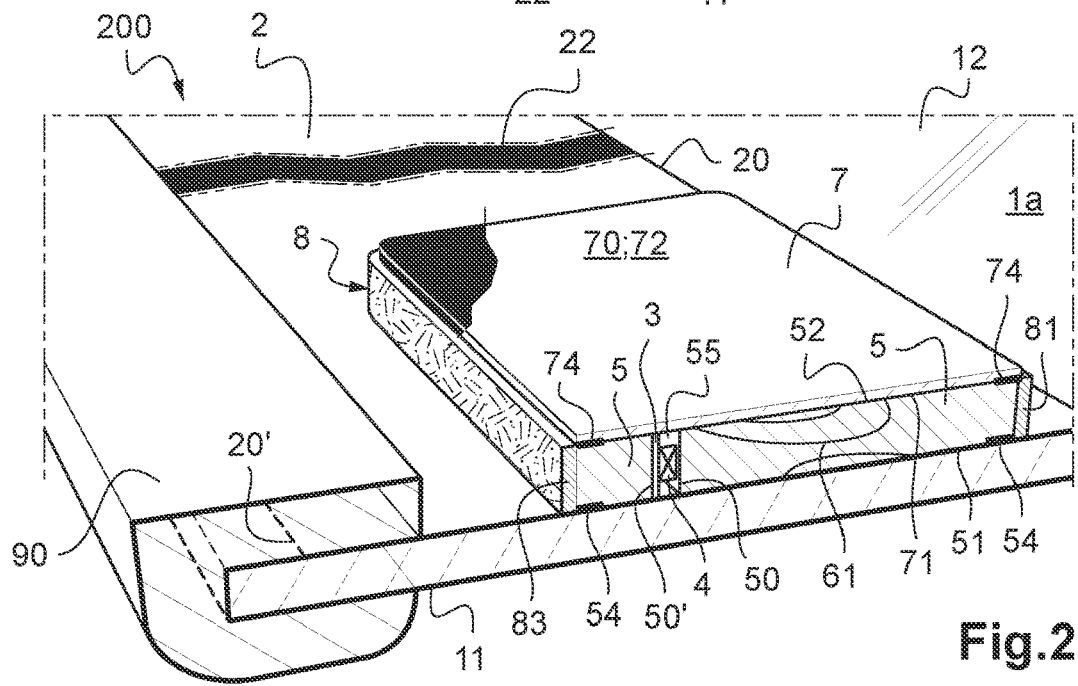
FIG. 2 represents a partial schematic view in section and in perspective of a light glazing showing the inner face F2 and a light device on the face F2 in a second embodiment according to the invention.

FIG. 2 represents a partial cross-sectional perspective schematic view of a light glazing 200 showing the inner face F2 and a light device on the face F2 in a second embodiment according to the invention.

Figure 3:
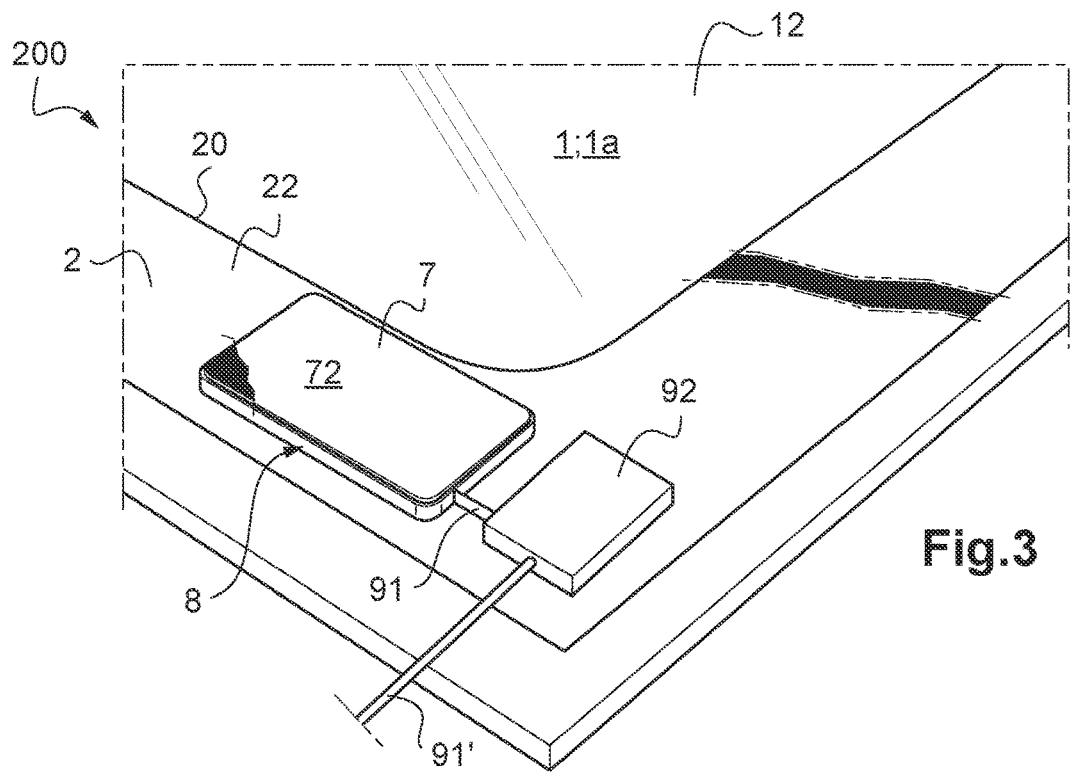
FIG. 3 represents another partial perspective schematic view of the light glazing of the second embodiment.

FIG. 3 represents another partial perspective schematic view of the light glazing 200 of the second embodiment.

Figure 4:
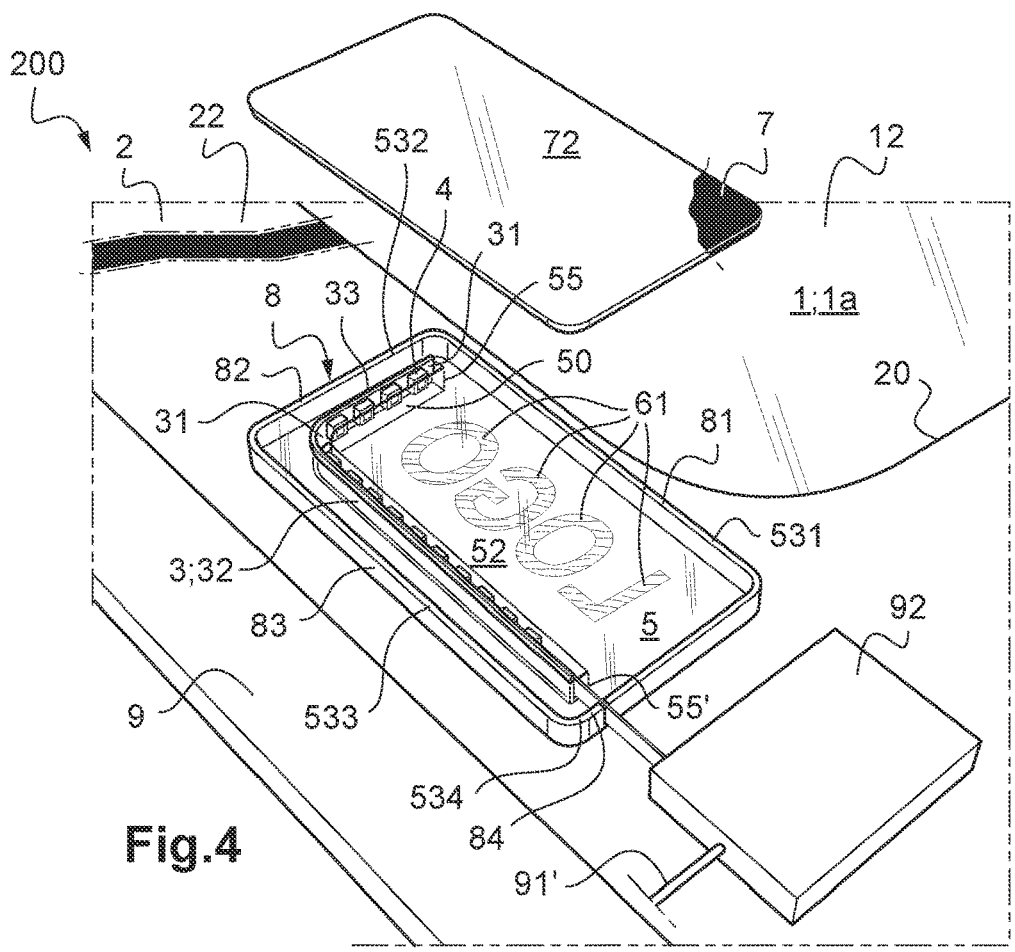
FIG. 4 represents another partial perspective and exploded schematic view of the light glazing of the second embodiment.

FIG. 4 represents another partial perspective and exploded schematic view of the light glazing 200 of the second embodiment.

This is a single light glazing 200 for a motor vehicle (car, truck, bus), here fixed (preferably), comprising:

- a first transparent sheet 1, preferably of tinted or colorless tempered glass or of plastic, with a main face called F1 intended to be directed toward the outside of the vehicle, a main face F2 12 intended to be directed toward the interior of the vehicle, and an edge
- on the face F2, a masking frame 2 of black ink or enamel (visible by transparency in FIG. 2) with top 21 and bottom 22, left 23 and right 24 strips leaving a see-throught portion 1a, delimited by an inner border 20 of the strip, for example of width W of 1 cm to 8 cm, for example 5 cm
- a first unmasked zone in the bottom longitudinal masking strip 22, unmasked zone for example closed therefore encircled by the strip 22, here representing the letters LOGO, for example letters 3 cm high by 2 cm wide
- a light device comprising:
  - a first light source, which is a first set of the top-emitting light-emitting diodes 4 each having a light-emitting face, diodes on a front face 31 of a first opaque source support 3,
  - on the face F2, a light guide 5 (here rectangular for example, with its length along the inner masking border 20) which is transparent with, on an outer main face Fe 51 of the light guide, a diffusing pattern 61 in the form of the same letters LOGO of the same size as or larger than the LOGO of the unmasked zone and facing the first unmasked zone, the guide 5 being glued onto the face F2 12 by its outer face Fe 51 by a peripheral double-sided adhesive tape 54, for example forming a frame,
  - a masking background 7 for the diffusing LOGO behind the light guide, black or gray like the enamel 2, which is a plate 70, black in its mass (or through a coating on a plastic film for example), plate 7 glued onto the outer face 51 of the guide 5 by its outer face 71 by means of a peripheral adhesive tape 74, for example forming a frame, background covering first extraction means 61,
- a framing polymeric encapsulation 90.

The light glazing comprises opaque means for trapping guided light likely to exit through the rim of the light guide, here an opaque adhesive tape 8 (white, etc.) over all the rim of the light guide (tapes applied end-to-end or piecewise):

tape 83 on a first rim 531 on the inner border side 20 of the masking strip 22, tape 81 on a first longitudinal rim 531 on the inner border side 20 of the masking strip 22 (also avoiding a stray halo in the see-throught portion), tape 82 on a second adjacent lateral rim 532, possibly tape 83 on a third longitudinal rim opposite the first rim and tape 84 on a fourth adjacent lateral rim 534.

The tapes 83 and 84 are optional because the first L-shaped source support 3, notably opaque (opacified, etc.), can already form a barrier to the light exiting through the edge.

The light guide 5 has a cavity 55 (see FIG. 4), here right through the thickness, here an L-shaped bent groove, housing the diodes 4, and its flexible source support 3, also L-shaped, a first wall 50 of the walls delimiting the cavity 55 being coupled optically to the first light source 4.

The assembly of source support 3 and diodes 4 can be force-fitted into the groove 50 or the rear face 32 of the source support 3 glued to the wall 50' opposite the coupling wall or even the front face 31 glued to the coupling wall 50.

The diodes in the form of an L make it possible to have more light. Alternatively, the cavity 55 is linear (without bend), the diode support 3 is a rectilinear bar.

It is possible to also have a masking cover covering the rear masking element 7, the trapping means 8 (by its flanges), possibly fixing the light guide 5 and/or the rear masking element 7 onto the face F2, cover masked from the outside by the masking strip 22.

The total thickness of the assembly of light guide 5, rear masking element 7 and possible cover covering the rear masking element is preferably at most 10 mm, notably from 2 to 10 mm, and even 3 to 5 mm, the thickness of the light guide is at most 3 mm, and even at most 1.5 mm.

The light glazing 200 also comprises control means 92 for the first light source 4, in particular the first light source being switched according to setpoint(s). Here these control means are glued onto the face F2 in proximity to the guide 5. They can also be on the first source support (front and/or rear face).

Electric wiring 91, 91' supplies the first light source 4 and the control means 92. The cavity 55 is extended by a groove 55' for guiding the wiring 91 exiting to the control means 92. The wiring 91 or 91' can exit parallel to the face F2 or with an angle with the face F2, for example normal to the face F2.

The first sheet 1 has a see-throught portion 1a. The first light source 4, the first source support 3, the light guide 5, the rear masking element 7, the control means for the first light source 92, the electrical power supply wiring 91 of the first light source, the trapping means 8 are absent from the see-throught portion.

The polymeric encapsulation 90 of the first sheet which is an overmolding, made of an encapsulation material, can cover the wiring and make it exit in a zone (of connection of the wiring in the vehicle) such as a border or corner adjacent or opposite to the border of the first sheet closest to the first unmasked zone.

The diodes emit in the white, yellow or any other color. The first unmasked zone is a set of discontinuities of the layer 2. Alternatively, the first unmasked zone 25 comprises a colored filter and, for example, the diodes emit in white light.

Alternatively, the diodes 4 emit in the UV and the diffusing pattern 61 is a diffusing layer comprising fluorescent luminophores or under a layer based on fluorescent luminophores.

Alternatively, the diodes 4 are side-emitting (the cavity 55 can be widened if necessary).

Figure 5:
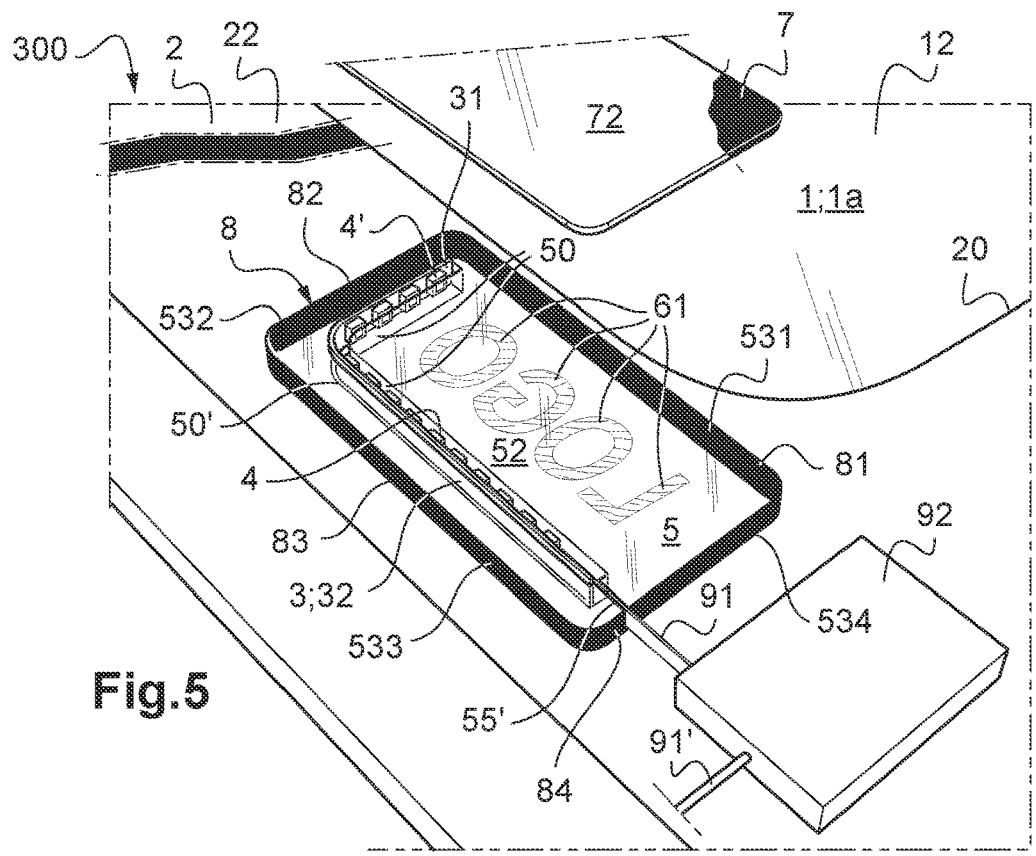
FIG. 5 represents a partial perspective and exploded schematic view of a light glazing in a third embodiment according to the invention.

FIG. 5 represents a partial perspective schematic view of a light glazing 300 in a third embodiment according to the invention.

The glazing 300 differs from the glazing 200 of the second embodiment in that:

the opaque adhesive tape on the perimeter 531 to 534 of the light guide 5 is replaced by a black paint 81 to 84 the diodes 4' on the small side of the L emit different colors for light effects.

Figure 6:
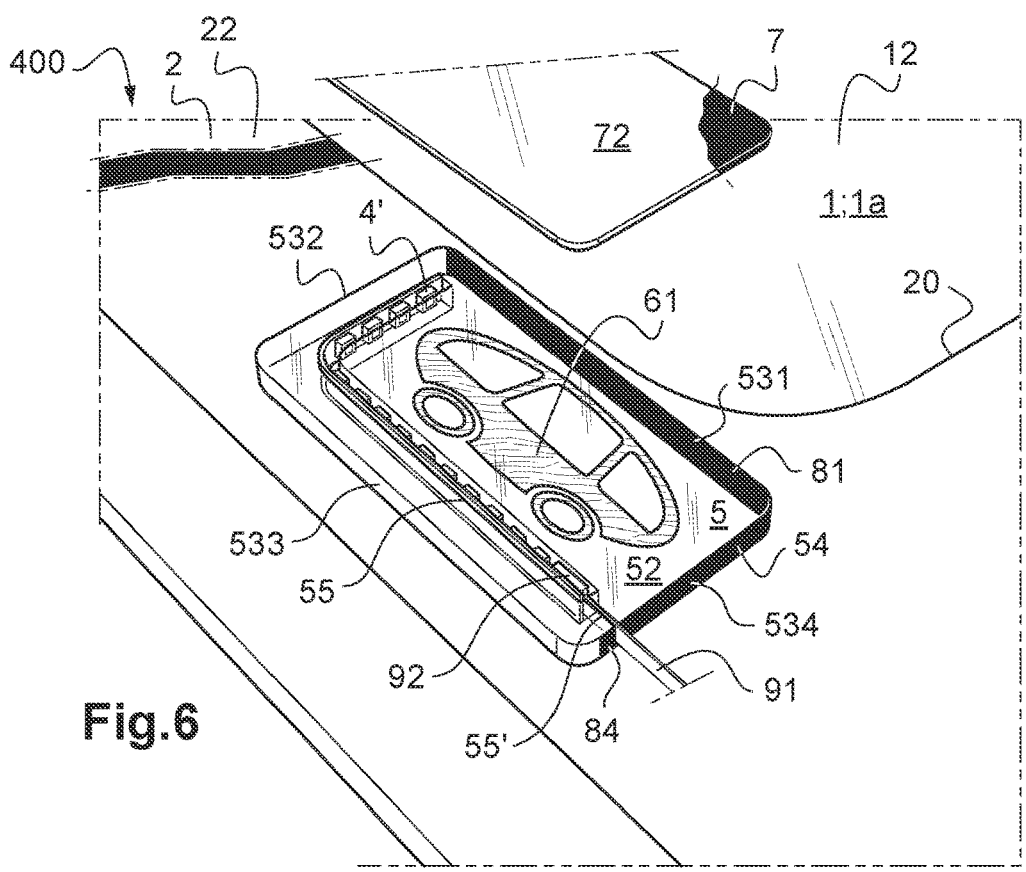
FIG. 6 represents a partial perspective and exploded schematic view of a light glazing in a fourth embodiment according to the invention.

FIG. 6 represents a partial perspective and exploded schematic view of a light glazing 400 according to the invention in a fourth embodiment.

The glazing 400 differs from the glazing 200 of the second embodiment in that:

the opaque adhesive tape on the perimeter of the guide is replaced by a black (paint) layer 81' 82' on at least the two rims 531 and 534 facing the coupling walls of the diodes 4 the pattern 61 is a pictogram, here a car that is green indicating a door (or trunk lid) opening, or red indicating a door (or trunk lid) closure or even white or yellow indicating that the vehicle has detected the user of the vehicle in proximity (linked with a presence detector for example)

the control means 92 are on the first diode support 3, in the cavity 55.

Figure 7:
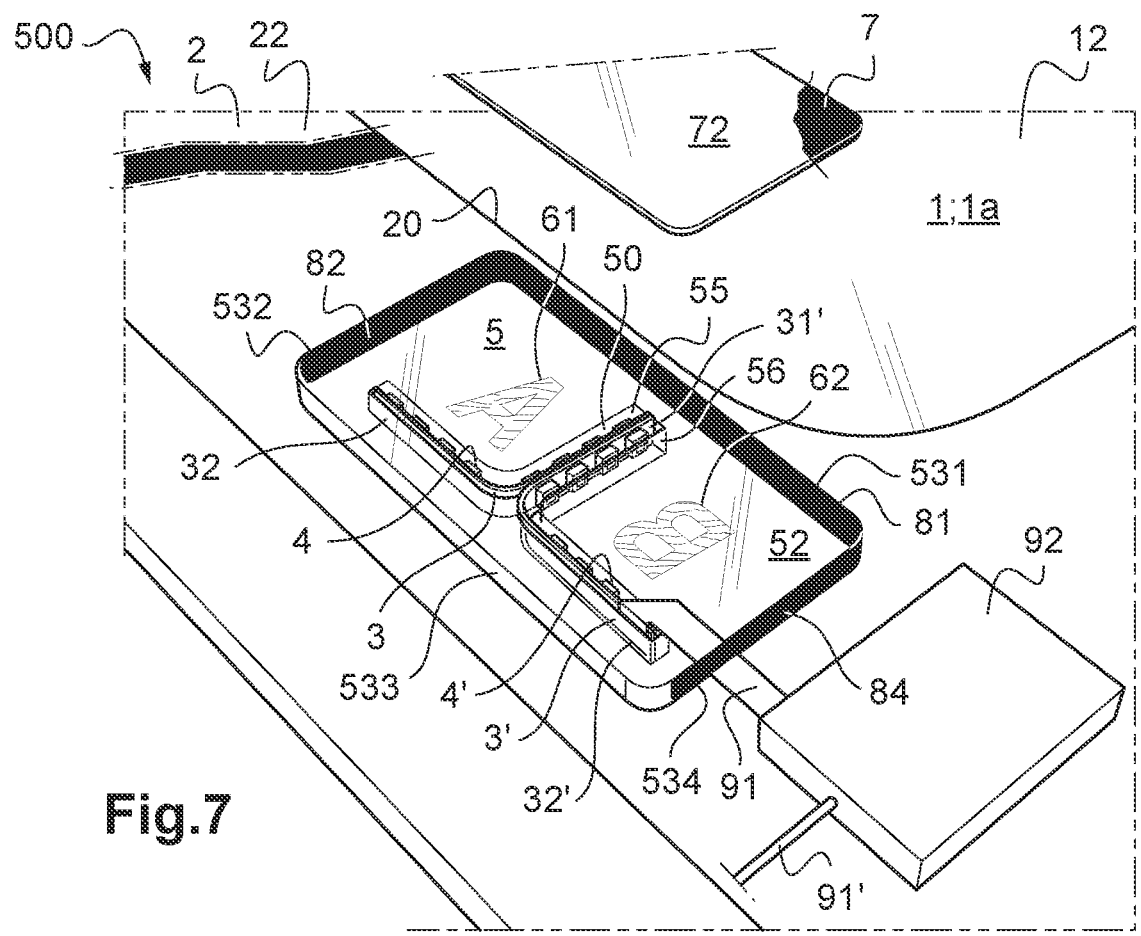
FIG. 7 represents a partial perspective and exploded schematic view of a light glazing in a fifth embodiment according to the invention.

FIG. 7 represents a partial perspective and exploded schematic view of a light glazing 500 in a fifth embodiment according to the invention.

The glazing 500 differs from the glazing 200 of the second embodiment in that:

the cavity 55 houses a second light source (diodes 4' on second diode support 3') back-to-back with the first light source 4 and a wall 56, delimiting the cavity 55, being coupled optically to the second light source, the light guide having second light extraction means (pattern 62 on the outer face 51) separated from the first light extraction means 61 by the cavity 55 in the form of a double L, the opaque adhesive tape on the perimeter is replaced by a black paint 81, 82 on at least the two rims 531 and 534 (and even the rim 533) facing the coupling walls of the diodes 4 the light guide 4 does not include a guiding groove for the wiring 91, the latter exits from the top between the rear masking element 7 and the inner face Fi 52 of the guide 5.

The pattern 61 can be signage illuminated independently of the pattern 62 and with a totally distinct function.

FIG. 8 represents a partial perspective and exploded schematic view of a light glazing 600 in a sixth embodiment according to the invention.

The glazing 600 differs from the glazing 200 of the second embodiment in that:

the diodes 4 are not in a cavity of the guide 5 but facing a rim 531, called optical coupling rim (inner border side 20)

the opaque adhesive tape on the perimeter is replaced by a black paint 82, 83, 84 on at least the three rims 532, 533 and 534 facing the coupling rim 531 of the diodes 4.

The diode support 3 can be glued to the coupling rim by its front face 31.

FIG. 8' represents a partial perspective and exploded schematic view of a light glazing 700 in a seventh embodiment according to the invention. FIG. 9 represents a partial perspective and exploded schematic view of the light glazing 700 of the seventh embodiment.

The glazing 700 differs from the glazing 200 of the second embodiment in that:
- the diodes 4 are not in a cavity of the guide 5 but over all the perimeter of the rim 53 of the guide, it is possible to choose four sets of diodes 4, 4', 4a, 4b on distinct supports 3, 3', 3a, 3b linked together by link 33 for the four longitudinal and lateral rims of the rectangular guide 4, it is possible to have one or more common diode supports alternatively (flexible support to this end)
- the opaque adhesive tape on the rim 53 is eliminated because the diode supports 3, 3', 3a, 3b are opaque.

Each diode support 3, 3', 3a, 3b can be glued to the coupling rim by its front face.

The light glazing 700 also comprises a masking cover 7' (see FIG. 9), for example black or white plastic, light sources, source supports and here, also control means 92, said cover covering the rear masking element, possibly fixing the light guide onto the face F2.

The cover 7' is also masked from the outside by the masking zone 2.

This cover can also serve in other embodiments, notably of FIGS. 8 and 8', to protect the diodes 4.

FIG. 9' represents a partial perspective and exploded schematic view of the light glazing 800 in an eighth embodiment according to the invention.

The glazing 800 differs from the glazing 600 of the sixth embodiment in that:
- the diodes 4 are side-emitting, the rear face of the diode support 3 being fixed onto the face F2
- the front face of the diode support 3 comprises control means for the diodes 92
- the coupling rim 533 is the longitudinal rim of the outer border side of the masking layer 2, the black paint 81, 82, 84 is on the other rims of the guide 5.

The light glazing 800 also comprises a masking cover 7' with opaque flanges 73 and a visible and opaque outer face 72', for example black or white plastic, in order to mask the diodes and the diode support 3, said cover covering the rear masking element, possibly fixing the light guide 5 onto the face F2. The cover 7' is also masked from the outside by the masking zone 2.

FIG. 10 represents a partial front schematic view of the light glazing 900 in a ninth embodiment according to the invention.

The glazing 900 differs from the glazing 600 of the sixth embodiment in that:
- the light guide 5 extends into a zone so-called peripheral zone devoid of encapsulation 90 (leaving the rim 13 of the sheet 3 and the outer masking border 20' visible), that can notably be housed between a vehicle edge and bodywork of the vehicle in mounted position
- the coupling rim of the guide 5 is the longitudinal rim closest to the rim 13 of the sheet 1, the black paint (or opaque scotch tape) 81, 82, 83 is on the other rims
- the front face of the diode support 3 comprises an adhesive 34 for fixing to the rim of the guide 5 and the control means of the diodes (not shown)
- the front face of the diode support 3 comprises the control means of the diodes (not shown) linked to a wiring (not shown), notably that can be housed between a vehicle edge and bodywork of the vehicle in mounted position and connected to a vehicle control unit.

The light glazing 900 can also comprise a masking cover (not shown) with opaque flanges and a visible and opaque outer face, for example black or white plastic, in order to mask the diodes and the diode support 3, said cover covering the rear masking element.

FIG. 11 represents, in a tenth embodiment of light glazing 1000, a schematic view showing, respectively on the left and on the right, four configurations a), b), c) and d) in descending order of preference of superpositioning (from left to right)
- of the rear masking element 7, which is, in preferred embodiment, a covering background opaque in a), b) and c) or that reproduces (in the same size or larger) the diffusing patterns 61 in d)
- of the light guide 5 with the diffusing patterns 61 in the form of signage in a), c) and d) or forming a diffusing background in b)
- and of the masking zone 2 with the first unmasked zone 25 reproducing the signage of diffusing pattern 61 in a) and d) or forming the signage in b) or even forming a frame unmasked zone in c) leaving the patterns 61 visible.

FIG. 12 represents, in an eleventh embodiment according to the invention, a schematic side view of a car 1100 incorporating fixed light glazings according to the invention (side window, preferably single, windshield, notably laminated, light, preferably single), notably:
- with a see-throught portion 11a
- on the face F2, a masking frame 2, for example in black or gray enamel (visible by transparency of the face 11 called F1) and masking frame comprising at least one first unmasked zone 25.

FIG. 13 represents, in a twelfth embodiment, a schematic side view of a people carrier 1200 incorporating light glazings according to the invention fixed according to the invention (side window, windshield, light), notably with a see-throught portion, a masking frame 2 (visible by transparency of face 11 called F1) and comprising at least one first unmasked zone 25 on the face F2.

FIG. 14 represents, in a thirteenth embodiment according to the invention, a partial schematic perspective view from the front of a car 1300 incorporating a dome (or, as a variant, a front vent light) comprising a border, extending on the top boundary of the windshield, with a masking strip 2 comprising the first unmasked zone 25.

This is a single glazing, for example made of plastic (PMMA, PC), or a laminated glazing.

The invention claimed is:

1. A light glazing for a motor vehicle, comprising:
a first transparent sheet having a see-through portion, wherein the first transparent sheet includes a first main face configured to be directed toward the outside of the vehicle, a second main face configured to be directed toward the interior of the vehicle, and an edge;
a masking zone having a width of at least 0.8 cm, wherein the masking zone is made of an opaque material, is disposed on the periphery of the see-through portion of the first transparent sheet, and facing one of the first main face and the second main face;
a first unmasked zone defined in the masking zone, wherein the first unmasked zone defines one or more first spaced-apart patterns;
a light guide disposed on a side of the second main face having an outer face facing the second main face of the first transparent sheet and an inner face opposite of the outer face;

a first light source optically coupled to the light guide, the light guide and the first light source being configured to illuminate the first unmasked zone;

a first light extraction device disposed on or within the light guide and opposite the first unmasked zone, wherein the first light extraction device is configured to extract light guided in the light guide such that one or more illuminated spaced apart patterns are visible on a side of the first main face, and wherein the first light extraction device is configured as one or more second spaced-apart patterns that illuminate the one or more first spaced-apart patterns of the first unmasked zone to form the one or more illuminated spaced apart patterns; and an opaque rear masking element disposed to cover the light guide on a side opposite the side facing the second main face, wherein the first light extraction device is disposed between the opaque rear masking element and the second main face; and wherein the first light source and the opaque rear masking element are absent from the see-through portion of the first transparent sheet.

2. The light glazing as claimed in claim 1, wherein the masking zone is of black or gray color, and the opaque rear masking element is of color that is identical or similar to the color of the masking zone.

3. The light glazing as claimed in claim 1, wherein the first light source is masked by the masking zone from the outside of the vehicle so as to be invisible on the side of the first main face and/or the first light source is at least partially offset from the second main face.

4. The light glazing as claimed in claim 3, further comprising a first light source support, wherein the first light source is disposed on the first light source support, wherein the first light source support is absent from the see-through portion of the first transparent sheet, wherein the first light source support extends from the periphery of the first transparent sheet, and wherein the first light source support is capable of being housed between a vehicle edge and a bodywork of the vehicle in a mounted position.

5. The light glazing as claimed in claim 4, further comprising a masking cover masking the first light source, wherein the masking cover is configured to cover the rear opaque masking element, and wherein the masking cover is masked by the masking zone.

6. The light glazing as claimed in claim 1, further comprising a controller to control the first light source.

7. The light glazing as claimed in claim 1, further comprising an encapsulation formed on the periphery of the first transparent sheet and electric wires supplying the first light source with power, wherein the encapsulation covers the electric wires.

8. The light glazing as claimed in claim 1, wherein the first light extraction device is inscribed in a surface of the light guide and the rear opaque masking element is a masking background and is inscribed in a surface of the rear opaque masking element, and wherein the inscribed region of the rear opaque masking element is larger than or equal to and covers the inscribed region of the light guide.

9. The light glazing as claimed in claim 1, wherein the rear opaque masking element substantially covers the inner face of the light guide and/or wherein the rear opaque masking element covers the inner face of the light guide at least in a region of the light guide that is aligned with the second main face of the first transparent sheet.

10. The glazing as claimed in claim 1, wherein the rear opaque masking element is disposed on the inner face of the light guide, wherein the rear opaque masking element is at least one of an opaque plate, an opaque covering, and a plate of an opaque cover having one or more opaque walls or flanges opposite a rim of the light guide and covering the rim, and wherein the outer face of the light guide is fitted and/or glued by an adhesive to the second main face and/or to a second transparent sheet laminated via polymer lamination to the first transparent sheet.

11. The light glazing as claimed in claim 1, wherein the light glazing comprises a trap device configured to trap light exiting through a rim of the light guide, the trap device configured as at least one of: an opaque layer on the rim of the light guide and/or an element against the rim of the light guide or spaced from the rim of the light guide by no more than 1 cm, an opaque adhesive tape on the rim of the light guide, and one or more opaque walls and/or flanges of a cover covering the rear opaque masking element or forming the rear opaque masking element with walls on or spaced apart from the rim of the light guide by no more than 1 cm.

12. The light glazing as claimed in claim 1, wherein the light glazing is a single glazing, wherein the first main face of the first transparent sheet is configured as an outer face of the vehicle, wherein the second main face of the first transparent sheet is configured as an inner face of the vehicle, and wherein the masking zone is disposed as a layer on the second main face.

13. The light glazing as claimed in claim 1, wherein the first light source comprises a set of inorganic light-emitting diodes on a front face of a first light source support.

14. The light glazing as claimed in claim 1, wherein the light guide comprises a cavity that passes through the thickness of the light guide and is masked by the masking zone, the light guide further comprising a first wall delimiting the cavity, wherein the first light source is disposed on at least one side of the first wall.

15. The light glazing as claimed in claim 14, wherein the cavity of the light guide is further configured to guide electric wiring to the first light source.

16. The light glazing as claimed in claim 14, wherein the light guide comprises a second light extraction device separated from the first light extraction device by the cavity, wherein the cavity houses a second light source optically coupled with the second light extraction device, and wherein the second light source is coupled to the first wall.

17. The light glazing as claimed in claim 1, wherein a combined thickness of the light guide, the rear opaque masking element, and an optional cover covering the rear opaque masking element is 10 mm or less.

18. The light glazing as claimed in claim 1, wherein the light glazing forms at least one of: a side window, a rear window, a windshield, a roof, a dome, and a strip that extends on the longitudinal boundary of a windshield.

19. A vehicle comprising at least one light glazing as claimed in claim 1.

20. The light glazing as claimed in claim 1, wherein the first light source comprises an ultraviolet light source and the light glazing comprises a fluorescent luminophore layer capable of converting ultraviolet light into visible light.

* * * * *